(12) United States Patent
Jacobson et al.

(10) Patent No.: US 9,256,460 B2
(45) Date of Patent: Feb. 9, 2016

(54) SELECTIVE CHECKPOINTING OF LINKS IN A DATA FLOW BASED ON A SET OF PREDEFINED CRITERIA

(71) Applicant: International Business Machines Corporation, Armonk, NY (US)

(72) Inventors: Eric A. Jacobson, Arlington, MA (US); Yong Li, Newton, MA (US); Shyam R. Mudambi, Wayland, MA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/843,425

(22) Filed: Mar. 15, 2013

(65) Prior Publication Data
US 2014/0282604 A1    Sep. 18, 2014

(51) Int. Cl.
G06F 9/46 (2006.01)
G06F 11/14 (2006.01)
G06F 9/50 (2006.01)

(52) U.S. Cl.
CPC ........ *G06F 9/461* (2013.01); *G06F 9/46* (2013.01); *G06F 9/5066* (2013.01); *G06F 11/14* (2013.01); *G06F 11/1446* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 5,752,030 A | 5/1998 | Konno et al. | |
| 5,996,088 A | 11/1999 | Frank et al. | |
| 6,434,664 B1 | 8/2002 | Buch et al. | |
| 6,549,928 B1 | 4/2003 | Mason et al. | |
| 6,584,581 B1 * | 6/2003 | Bay ..................... | G06F 11/1471 714/16 |
| 6,654,907 B2 | 11/2003 | Stanfill et al. | |
| 6,725,211 B1 | 4/2004 | Ashton et al. | |
| 6,983,234 B1 | 1/2006 | Hangal et al. | |
| 7,337,444 B2 * | 2/2008 | Browning ............... | G06F 9/524 710/200 |
| 7,664,940 B2 | 2/2010 | Conklin et al. | |
| 7,769,717 B2 | 8/2010 | Federwisch et al. | |
| 7,873,719 B2 | 1/2011 | Bishop et al. | |
| 7,895,474 B2 | 2/2011 | Collins et al. | |
| 8,015,541 B1 | 9/2011 | Srinivasan et al. | |
| 8,015,564 B1 | 9/2011 | Beyer et al. | |

(Continued)

FOREIGN PATENT DOCUMENTS

| | | |
|---|---|---|
| CN | 101799809 A | 8/2010 |
| CN | 102063336 A | 5/2011 |
| JP | 2012118669 A | 6/2012 |

OTHER PUBLICATIONS

U.S. Appl. No. 13/842,960, entitled Deploying Parallel Data Integration Applications to Distributed Computing Environments, filed Mar. 15, 2013.

(Continued)

*Primary Examiner* — Emerson Puente
*Assistant Examiner* — Benjamin Wu
(74) *Attorney, Agent, or Firm* — Patterson & Sheridan, LLP

(57) ABSTRACT

Techniques are disclosed for qualified checkpointing of a data flow model having data flow operators and links connecting the data flow operators. A link of the data flow model is selected based on a set of checkpoint criteria. A checkpoint is generated for the selected link. The checkpoint is selected from different checkpoint types. The generated checkpoint is assigned to the selected link. The data flow model, having at least one link with no assigned checkpoint, is executed.

20 Claims, 25 Drawing Sheets

(56) References Cited

U.S. PATENT DOCUMENTS

| | | | |
|---|---|---|---|
| 8,129,848 | B2 | 3/2012 | Lee |
| 8,166,479 | B2 | 4/2012 | Roberts et al. |
| 8,219,848 | B2 | 7/2012 | Branson et al. |
| 8,224,986 | B1 | 7/2012 | Liskov et al. |
| 8,572,051 | B1* | 10/2013 | Chen ................. G06F 17/30445 707/687 |
| 8,825,599 | B2* | 9/2014 | Goldberg et al. ............. 707/639 |
| 2002/0055868 | A1 | 5/2002 | Dusevic et al. |
| 2002/0188653 | A1* | 12/2002 | Sun ............................... 709/201 |
| 2002/0194248 | A1 | 12/2002 | Wood et al. |
| 2003/0135621 | A1 | 7/2003 | Romagnoli |
| 2005/0188364 | A1 | 8/2005 | Cockx et al. |
| 2006/0136279 | A1* | 6/2006 | Maybee ........... G06Q 10/06316 705/7.26 |
| 2006/0156157 | A1* | 7/2006 | Haselden et al. ............. 714/746 |
| 2006/0294435 | A1* | 12/2006 | Vick ................... G06F 11/1438 714/38.13 |
| 2007/0067373 | A1 | 3/2007 | Higgins et al. |
| 2007/0094214 | A1 | 4/2007 | Li et al. |
| 2007/0266368 | A1* | 11/2007 | Szpak ........................ G06F 8/10 717/105 |
| 2007/0266384 | A1 | 11/2007 | Labrou et al. |
| 2008/0263555 | A1 | 10/2008 | Ventroux et al. |
| 2009/0007127 | A1 | 1/2009 | Roberts et al. |
| 2009/0187756 | A1 | 7/2009 | Nollet et al. |
| 2009/0260009 | A1* | 10/2009 | Pinto ........................ G06F 9/466 718/100 |
| 2009/0265707 | A1 | 10/2009 | Goodman et al. |
| 2010/0122065 | A1 | 5/2010 | Dean et al. |
| 2011/0016214 | A1 | 1/2011 | Jackson |
| 2011/0016354 | A1* | 1/2011 | Douros ............... G06F 11/1438 714/16 |
| 2011/0078499 | A1* | 3/2011 | Fong ................... G06F 11/1438 714/15 |
| 2011/0145392 | A1 | 6/2011 | Dawson et al. |
| 2011/0145830 | A1 | 6/2011 | Yamaguchi |
| 2011/0173289 | A1 | 7/2011 | Chen et al. |
| 2011/0173488 | A1 | 7/2011 | Blumrich et al. |
| 2011/0238797 | A1 | 9/2011 | Wee |
| 2012/0011401 | A1 | 1/2012 | Ranganathan et al. |
| 2012/0079497 | A1 | 3/2012 | Gangemi et al. |
| 2012/0102189 | A1 | 4/2012 | Burge et al. |
| 2012/0151198 | A1 | 6/2012 | Gupta et al. |
| 2012/0304003 | A1* | 11/2012 | Goldstein et al. ............... 714/15 |
| 2012/0317579 | A1 | 12/2012 | Liu |
| 2013/0247069 | A1* | 9/2013 | Chen ................... G06F 11/1438 718/107 |
| 2014/0208169 | A1* | 7/2014 | Randhir ................. G06Q 10/06 714/45 |
| 2014/0215471 | A1 | 7/2014 | Cherkasova et al. |
| 2014/0280159 | A1 | 9/2014 | Cao et al. |
| 2014/0359624 | A1 | 12/2014 | Cherkasova et al. |
| 2014/0372611 | A1 | 12/2014 | Matsuda et al. |

OTHER PUBLICATIONS

U.S. Appl. No. 13/842,484, entitled Data Integration on Retargetable Engines in a Networked Environment, filed Mar. 15, 2013.

Anonymous, Methods for Application Checkpointing using Application Dependence Analysis, IP.com: Prior Art Database, Oct. 16, 2012, IP.com, Fairport, United States.

Motorola et al., Selective Session Recovery Based on Domain Specific Prioritization Criteria, IP.com: Prior Art Database, Feb. 21, 2012, IP.com, Fairport, United States.

Anonymous, Optimal checkpoint interval based on intelligent model using database interval factors, IP.com: Prior Art Database, Feb. 3, 2012, IP.com, Fairport, United States.

Various Universities, On the Optimum Checkpoint Selection Problem, IP.com: Prior Art Database, Mar. 29, 2007, IP.com, Fairport, United States.

Ferkouss, Omar El et al., Performance model for mapping processing tasks to OpenFlow switch resources, 2012 IEEE International Conference on Communications, Jun. 2012, IEEE, Piscataway, United States.

Kirischian, Lev, Optimization of Parallel Task Execution on the Adaptive Reconfigurable Group Organized Computing System, Proceedings of the International Conference on Parallel Computing in Electrical Engineering, 2000, IEEE, Piscataway, United States.

Wang, Bo et al., Task optimization based on CPU pipeline technique in a multicore system, Computers & Mathematics with Applications, Jan. 2012, vol. 63, Issue 2, Pergamon Press, Inc., Tarrytown, United States.

Vandierendonck, Hans et al., Parallel Programming of General-Purpose Programs Using Task-Based Programming Models, Proceedings of the 3rd USENIX conference on Hot topic in parallelism, 2011, USENIX Association, Berkeley, United States.

Varisteas, Georgios, et al., Resource management for task-based parallel programs over a multi-kernel, Proceedings of the 2012 workshop on Runtime Environments, Systems, Layering and Virtualized Environments, 2012, Association for Computing Machinery (ACM), New York, United States.

U.S. Appl. No. 13/843,425, entitled "Qualified Checkpointing of Data Flows in a Processing Environment", filed Mar. 15, 2013.

Patent Cooperation Treaty, Search Report and Written Opinion for International Application No. PCT/IB2014/059199, dated May 27, 2014.

U.S. Appl. No. 13/966,903, entitled "Task-Based Modeling for Parallel Data Integration", filed Aug. 14, 2013.

U.S. Appl. No. 14/485,362, entitled "Task-Based Modeling for Parallel Data Integration", filed Sep. 12, 2014.

U.S. Appl. No. 14/224,640, entitled "Deploying Parallel Data Integration Applications to Distributed Computing Environments", filed Mar. 25, 2014.

* cited by examiner

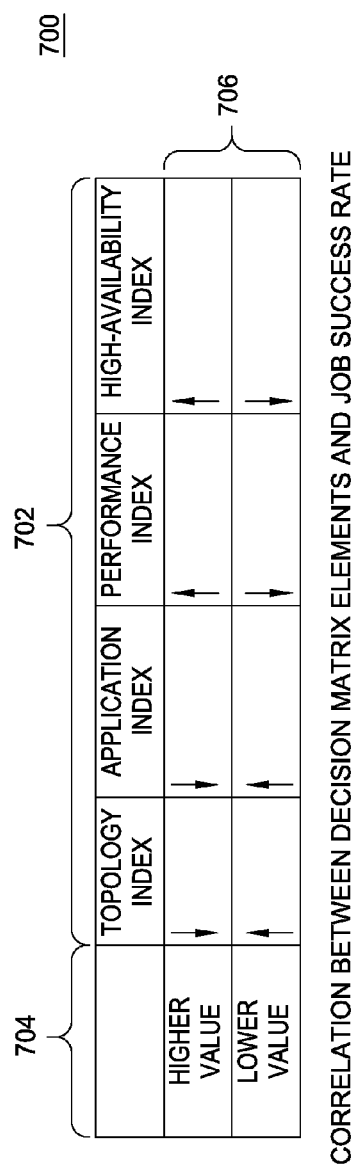
FIG. 7
CORRELATION BETWEEN DECISION MATRIX ELEMENTS AND JOB SUCCESS RATE
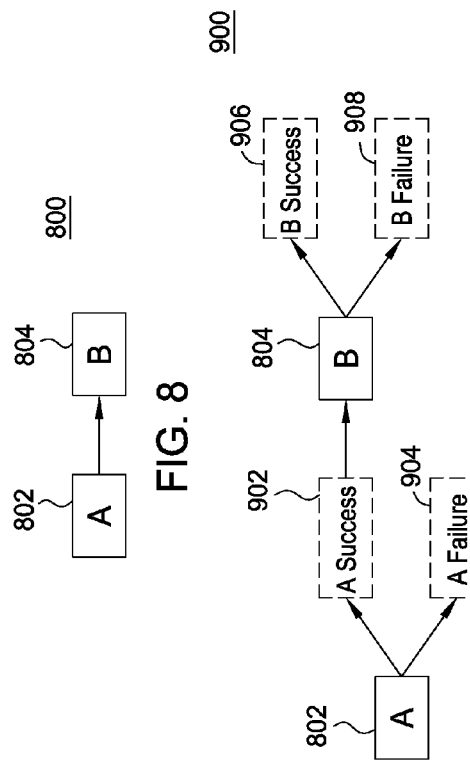
FIG. 8
FIG. 9

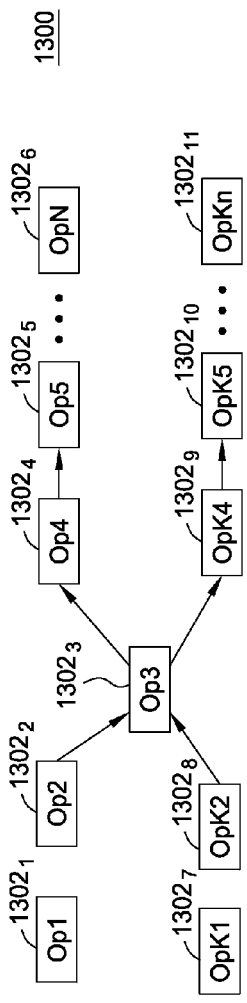
FIG. 13
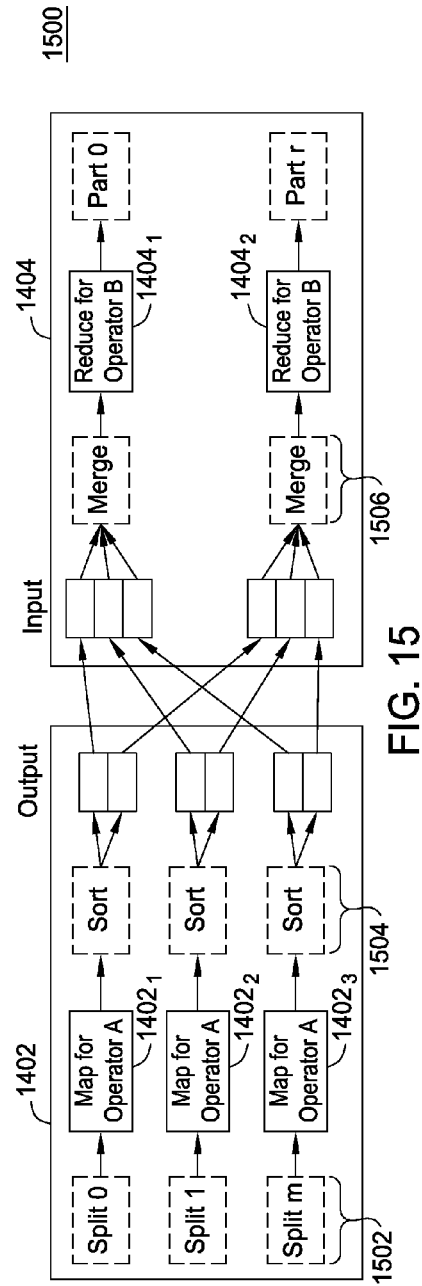
FIG. 14
FIG. 15

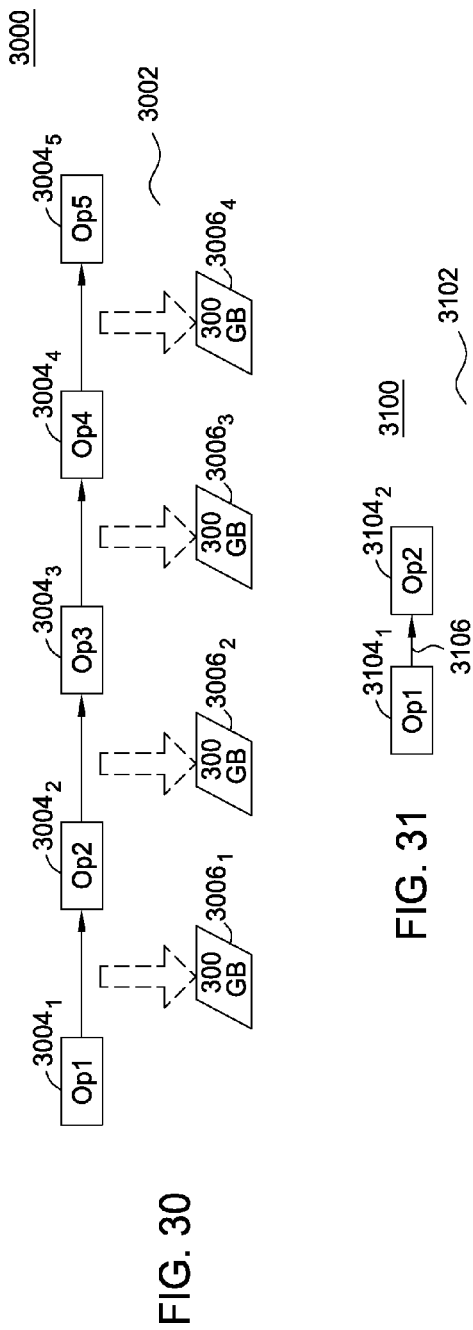

SELECTIVE CHECKPOINTING OF LINKS IN A DATA FLOW BASED ON A SET OF PREDEFINED CRITERIA

BACKGROUND

1. Field of the Invention

Embodiments disclosed herein relate to data integration. More specifically, embodiments disclosed herein relate to data integration on retargetable engines in a networked environment.

2. Description of the Related Art

Cloud computing environments often include a master computing device and multiple worker computing devices. Work is distributed from the master computing device into the cloud and to the worker computing devices within the cloud. The worker computing devices perform the work and return the results to the master computing device. The master computing device then assembles the results received from the worker computing devices.

SUMMARY

Embodiments presented in this disclosure provide a computer-implemented method for qualified checkpointing of a data flow model having data flow operators and links connecting the data flow operators. The method includes selecting a link of the data flow model, based on a set of checkpoint criteria. The method also includes generating a checkpoint for the selected link, where the checkpoint is selected from multiple different checkpoint types, and where the generated checkpoint is assigned to the selected link. The method also includes executing the data flow model, where at least one link of the data flow model has no assigned checkpoint.

Other embodiments presented in this disclosure provide a computer program product for qualified checkpointing of a data flow model having data flow operators and links connecting the data flow operators. The computer program product includes a computer-readable storage medium having program code embodied therewith. The program code is executable by one or more computer processors to select a link of the data flow model, based on a set of checkpoint criteria. The program code is also executable to generate a checkpoint for the selected link, where the checkpoint is selected from multiple different checkpoint types, and where the generated checkpoint is assigned to the selected link. The program code is also executable in order to execute the data flow model, where at least one link of the data flow model has no assigned checkpoint.

Still other embodiments presented in this disclosure provide a system for qualified checkpointing of a data flow model having data flow operators and links connecting the data flow operators. The system includes one or more computer processors and a memory containing a program which, when executed by the one or more computer processors, is configured to perform an operation that includes selecting a link of the data flow model, based on a set of checkpoint criteria. The operation also includes generating a checkpoint for the selected link, where the checkpoint is selected from multiple different checkpoint types, and where the generated checkpoint is assigned to the selected link. The operation also includes executing the data flow model, where at least one link of the data flow model has no assigned checkpoint.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 7 is a table depicting predefined correlations between elements of a decision matrix and job success rate, according to one embodiment presented in this disclosure.

FIG. 8 depicts a data flow model of a sequential job, according to one embodiment presented in this disclosure.

FIG. 9 depicts a job success rate model for the data flow model, according to one embodiment presented in this disclosure.

FIG. 13 depicts a parallel engine data flow, according to one embodiment presented in this disclosure.

FIG. 14 illustrates a data flow model for a distributed computing data flow, according to one embodiment presented in this disclosure.

FIG. 15 illustrates a data flow model that includes additional tasks performed for a distributed computing data flow, according to one embodiment presented in this disclosure.

FIG. 30 illustrates a data flow that involves persisting a large amount of data to disk, according to one embodiment presented in this disclosure.

FIG. 31 illustrates a data flow in context of determining whether an operator is stateful, according to one embodiment presented in this disclosure.

FIG. 32 is a table illustrating state determination rules for data flows, according to one embodiment presented in this disclosure.

DETAILED DESCRIPTION

Figure 1:
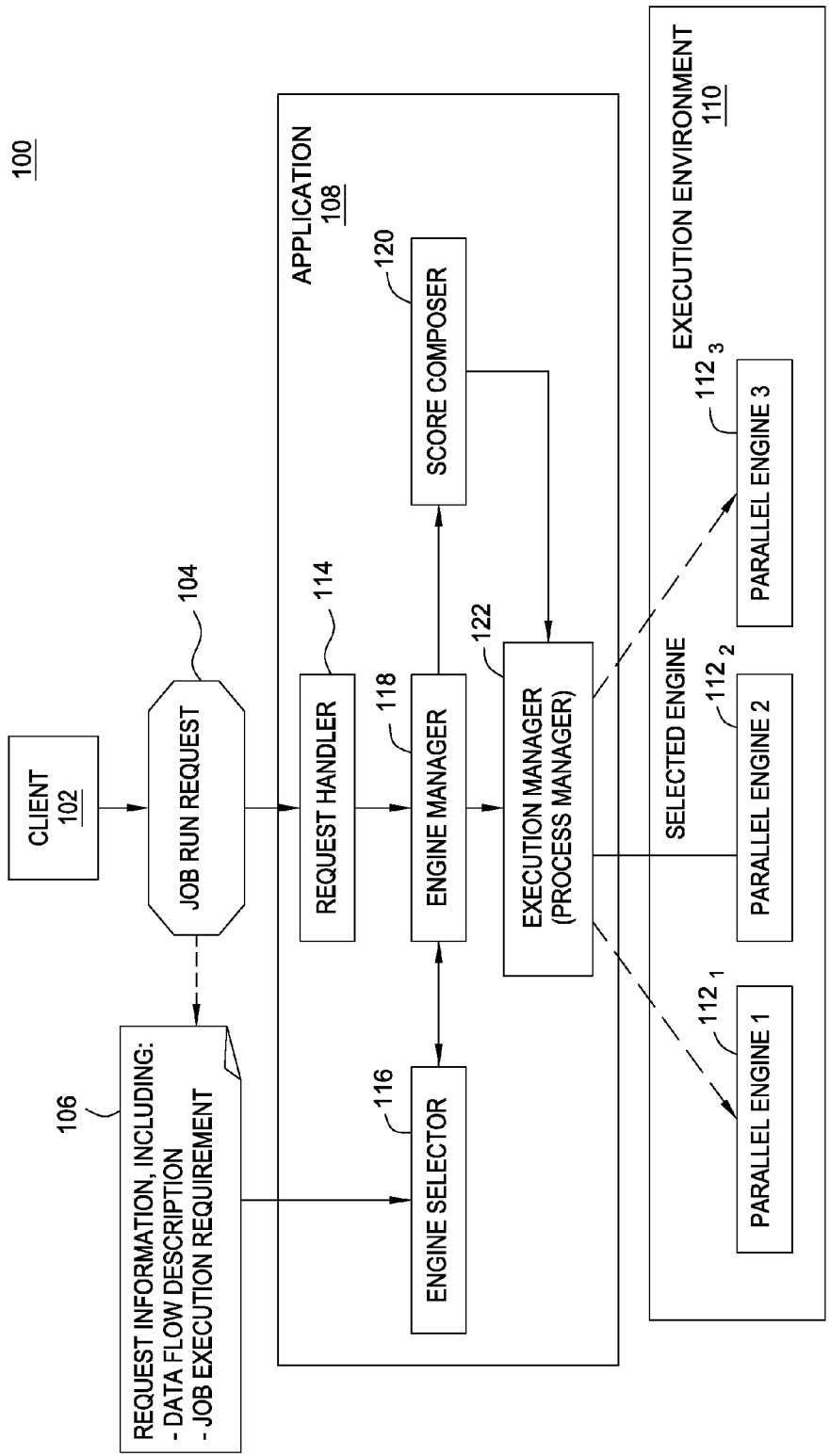
FIG. 1 is a block diagram illustrating components of an application for data integration on retargetable engines in a networked environment, according to one embodiment presented in this disclosure.

Efforts of organizations in meeting business requirements while lowering cost may often be aided by cloud computing, which provides infrastructure, platform, software, and process as services, and which may often simplify adoption by the organizations. A cloud computing environment, also referred to herein as a cloud environment, may include different types of applications, of which one example is data integration applications. Data integration applications may often be designed to run in networked environments, such as symmetric multiprocessing (SMP), massively parallel processing (MPP), cluster, or grid environments, that include only a single data processing engine, also referred to herein as a processing engine. On the other hand, in a cloud computing environment, multiple data processing engines may coexist and share common resources. A client may submit a job request to the cloud computing environment, without needing to know or specify any particular data processing engine for running the desired job. An example of a job request is a request to execute a desired data flow model, also referred to herein as a data flow. Programmatically choosing an appropriate data processing engine to run the desired job may be one of the challenges posed in migrating data integration to the cloud computing environment.

In some embodiments and as discussed in further detail herein, one approach to resolve this challenge involves a perspective of retargetable engines. In one embodiment, an application is provided that is configured to select a data processing engine based on job characteristics and execution requirements. The data processing engine may be selected from a set of data processing engines of different types. Examples of different types of data processing engines include parallel processing engines and distributed computing engines. For example, a parallel processing engine may be a scalable data integration processing engine, while an example of a distributed computing engine is a scalable distributed computing engine for cloud computing environments, such as Hadoop™, available from Apache Software Foundation. The distributed computing engine may also include a MapReduce model, which provides an interface to facilitate meeting various data integration needs.

At least in some embodiments, the respective paradigms of parallel processing engines and MapReduce each involves parallelizing programs by partitioning data across multiple processes in both a pipeline and partitioned manner. However, the two execution mechanisms may differ dramatically in terms latency, because parallel processing engines may use inter-process communication (IPC) mechanisms for data transfer, whereas MapReduce applications may use file-system mechanisms for data transfer. As a result, jobs that do not cause pipeline breaks or stalls may often run faster—even an order of magnitude faster in some cases—on parallel processing engines than on MapReduce applications.

On the other hand, the MapReduce paradigm may provide a higher level of fault tolerance than parallel processing engines at least in some embodiments, because all state information is stored on the file system. Doing so may at least in some cases avoid job failures caused by failure of a single mapper process. The higher level of fault tolerance may be especially important for any single, significantly large-scale parallel jobs, where the likelihood of a particular process failing may be relatively higher.

In some embodiments, data processing engines of multiple paradigms may be available to run a desired job. Accordingly, at least some embodiments disclosed herein provide empirical models for programmatically selecting an appropriate data processing engine for running the desired job and without requiring any user input specifying any desired data processing engine. The data processing engine may be selected based on predefined criteria. Examples of the predefined criteria include input data, job design complexity, application logic, performance requirement, latency requirement, fault tolerance, checkpoint restart, parallelism, resource utilization, parallel execution setup cost, etc. Further, due to the dynamic nature of the predefined criteria, the appropriate data processing engine may vary from execution to execution, even for the same desired job. By providing retargetable engines, the needs of desired jobs may be more readily met, even as the needs change over time, such as in terms of data volume, required execution time, number of partitions, etc.

One embodiment provides a decision-making job-execution system for efficiently running a data flow using a selected data processing engine in a networked environment, such as a cloud environment. The data processing engine may be selected upon determining that the data processing engine best satisfies predefined criteria, such as one or more of speed, efficiency, resource consumption, job execution success rate, user-specified execution time constraints, etc. In some embodiments, the application may also include multiple application components, also referred to herein as components.

FIG. 1 is a block diagram 100 illustrating components of an application 108 for data integration on retargetable engines in a networked environment, according to one embodiment presented in this disclosure. As shown, the application 108 includes a request handler 114, an engine selector 116, an engine manager 118, a score composer 120, and an execution manager 122, also referred to herein as a process manager. In one embodiment, the application 108 receives a job run request 104 from a client 102. The application 108 may also receive additional information 106 associated with the job run request 104, such as a data flow description, a job execution requirement, etc. Based on the job run request 104 and the additional information 106, the application 108 selects one of the parallel engines 112 in the execution environment 110, for running the desired job. The desired job may then run on the selected parallel engine 112. As described above, because the needs of the same job may vary from execution to execution, the application 108 may select a different parallel engine 112 for a subsequent execution of the application 108 in the execution environment 110.

In one embodiment, the request handler 114 manages integration of and interaction among all the components of the application 108. The request handler 114 may be responsible for invoking a series of operations needed for processing the job run request 104. The engine manager 118 may be responsible for running the desired job on the appropriate processing engine. To this end, the engine manager 118 may invoke the engine selector 116 to select the appropriate processing engine based on predefined criteria. The engine manager 118 may also invoke the score composer 120 to generate an execution plan for the selected processing engine. The engine manager 118 may also invoke the execution manager 122 to implement the generated execution plan on the selected processing engine.

In one embodiment, the engine selector 116 may be responsible for selecting an appropriate processing engine for running a desired job. At least in some embodiments, the processing engine may be selected based on a predefined model that has predefined criteria as inputs to the model. Examples of the predefined criteria include the job toplogy associated with the desired job, the parallelization capacity for each operator in the topology, the unit cost of reading and writing a fixed block of data to the backing store, the expected mean time between failures (MTBF) for the desired job, etc. The parallelization capacity, also referred to herein as parallelization potential, represents a measure of scalability of an individual component in a data flow.

Accordingly, the engine selector 116 may automatically select an appropriate processing engine on which to run a desired job, based on a size of the input data associated with the desired job and based further on the computing resources available in the cloud environment. Further, the same job may be submitted with different execution requirements, which may in turn result in selection of a different processing engine for running the job.

In one embodiment, the score composer 120 is responsible for generating the execution plan for the given job on the selected processing engine. As stated above, the execution manager 122 may be configured to implement the execution plan of the given job on the selected processing engine. Accordingly, the techniques disclosed herein may be adopted to facilitate migrating data integration processes to desired network environments, such as cloud computing environments. At least in some embodiments, the data integration processes may be migrated to a unified networked environment that supports multiple data processing engines, such as parallel processing engine and distributed computing engine. Further, the target, or selected, processing engine may vary from execution to execution of the same data flow, thereby providing the retargetable property of each processing engine in the networked environment. The desired job is executed on a processing engine that is deemed by the application 108 as being most suitable for executing the desired job, based on predefined criteria such as job characteristics and execution requirements. To this end, a job execution plan for the desired job and that is specific to the selected processing engine is generated, and execution of the desired job commences on the selected processing engine based on the job execution plan. Consequently, desired jobs may be executed more efficiently in the networked environment at least in some cases.

In some embodiments, in order to evaluate the predefined criteria to select a processing engine, the application 108 generates a decision matrix that may include multiple elements. In a particular embodiment, the decision matrix includes a job topology complexity index, a job application logic complexity index, a job performance index, and a job high availability index. Depending on the embodiment, each index may be represented as a numerical or string value. Based on the decision matrix, a job success rate may also be determined. Depending on the embodiment, the job success rate may be considered part of or external to the decision matrix. Further, each of the elements other than the job success rate may be individually examined to determine its impact on the job success rate. An appropriate processing engine may then be selected based on the decision matrix. The job success rate may also be referred to as a job success likelihood or a job success probability.

In one embodiment, the application 108 uses empirical modeling to determine the job success rate and to select the appropriate processing engine. For example, in a particular empirical model, a data flow includes one or more branches, and each branch is either independent, which is characterized by no sharing of operators, or correlated with another branch via one or more operators. A branch contains a chain of operators arranged in terms of producing and consuming sequences. The failure rate of an operator is equal to the estimated execution time divided by the MTBF, whereas the success rate of an operator is equal to one minus its failure rate. The success rate of a branch on one partition is equal to the multiplication of the success rate of each operator on that partition, while the success rate of a branch on all partitions is equal to the average success rate of all partitions. The success rate of a branch counting startup is equal to the average success rate of all partitions multiplied by the success rate of branch startup. The success rate of a data flow is equal to the minimum success rate among all branches. On the other hand, in an alternative empirical model, the success rate is determined by the success rate of all physical nodes and an extra cost needed for maintaining a desired level of high availability.

Figure 2:
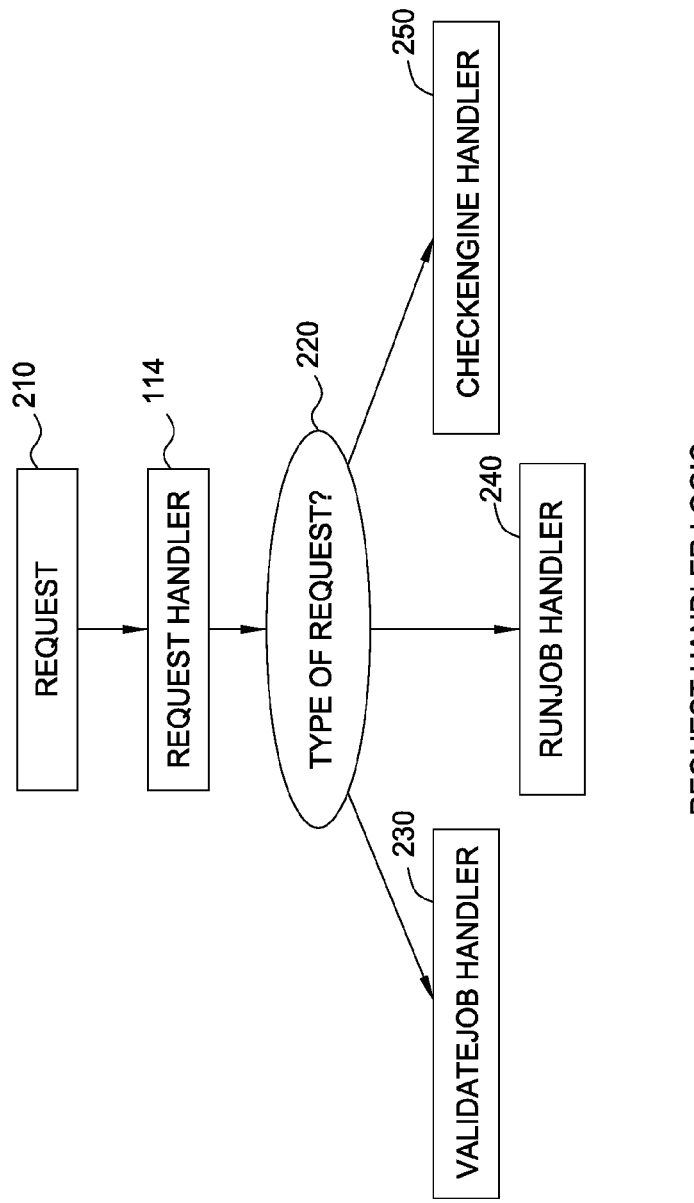
FIG. 2 is a data flow diagram depicting processing logic of a request handler component of the application, according to one embodiment presented in this disclosure.

FIG. 2 is a data flow diagram 200 depicting processing logic of the request handler 114 of FIG. 1, according to one embodiment presented in this disclosure. As shown, upon receiving a request 210, the request handler 114 determines the type of the received request (step 220). In one embodiment, the request handler 114 supports different types of requests, including a check engine request, a validate job request, and a run job request. If the request is a check engine request, then the request handler 114 invokes a check engine handler 250 in order to generate a list of available processing engines. If the request is a validate job request, then the request handler 114 invokes a validate job handler 230 in order to verify the design and configuration of a specified data flow to ensure that the data flow is valid. If the request is a run job request, then the request handler 114 invokes a run job handler 240 to manage aspects pertaining to executing a desired job. The processing logic and the types of requests supported by the request handler 114 may be tailored to suit the needs of a particular case.

Figure 3:
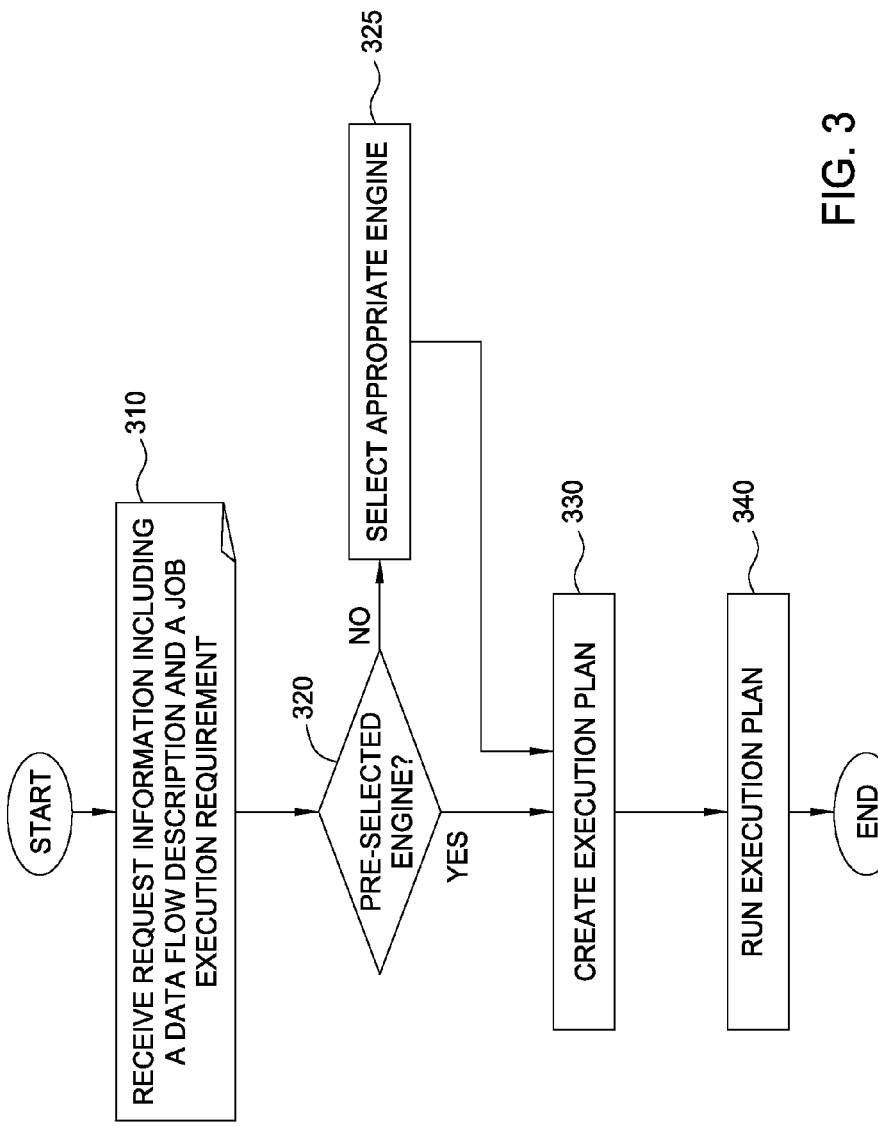
FIG. 3 is a flowchart depicting processing logic of an engine manager component of the application, according to one embodiment presented in this disclosure.

FIG. 3 is a flowchart 300 depicting processing logic of the engine manager 118 of FIG. 1, according to one embodiment presented in this disclosure. As shown, the flowchart 300 begins at step 310, where the engine manager 118 receives request information such as a data flow description, job execution requirements, etc. At step 320, the engine manager 118 determines whether a processing engine is pre-selected. If not, then the engine manager 118 selects a suitable processing engine based on the request information and according to the empirical model described above (step 325). At step 330, the engine manager 118 generates an execution plan for the desired job and specific to the selected or preselected processing engine. At step 340, the engine manager 118 executes the desired job by running the execution plan. After the step 340, the flowchart 300 ends.

Figure 4:
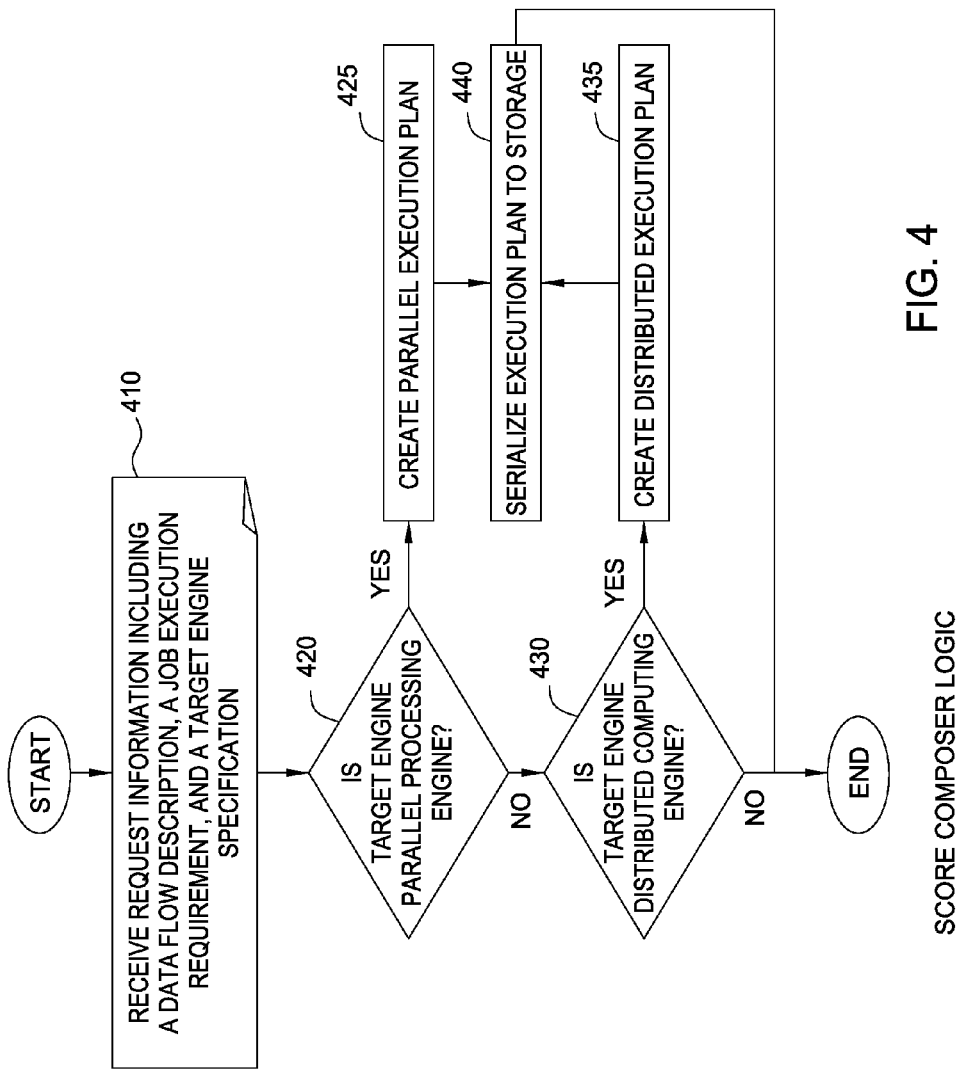
FIG. 4 is a flowchart depicting processing logic of a score composer component of the application, according to one embodiment presented in this disclosure.

FIG. 4 is a flowchart 400 depicting processing logic of the score composer 120 of FIG. 1, according to one embodiment presented in this disclosure. As shown, the flowchart 400 begins at step 410, where the score composer 120 receives request information such as a data flow description, job execution requirements, a target engine specification, etc. At step 420, the score composer 120 determines whether the target engine is the parallel processing engine. If so, the score composer 120 generates a parallel execution plan for the desired job (step 425). On the other hand, if the score composer 120 determines that the target engine is the distributed processing engine rather than the parallel processing engine (step 430), then the score composer 120 generates a distributed execution plan for the desired job (step 435). The score composer 120 then serializes and stores the generated parallel or distributed execution plan to storage (step 440). After the step 440 or if no processing engine is selected, the flowchart 400 ends. The number and specific types of processing engines supported may be tailored to suit the needs of a particular case.

Figure 5:
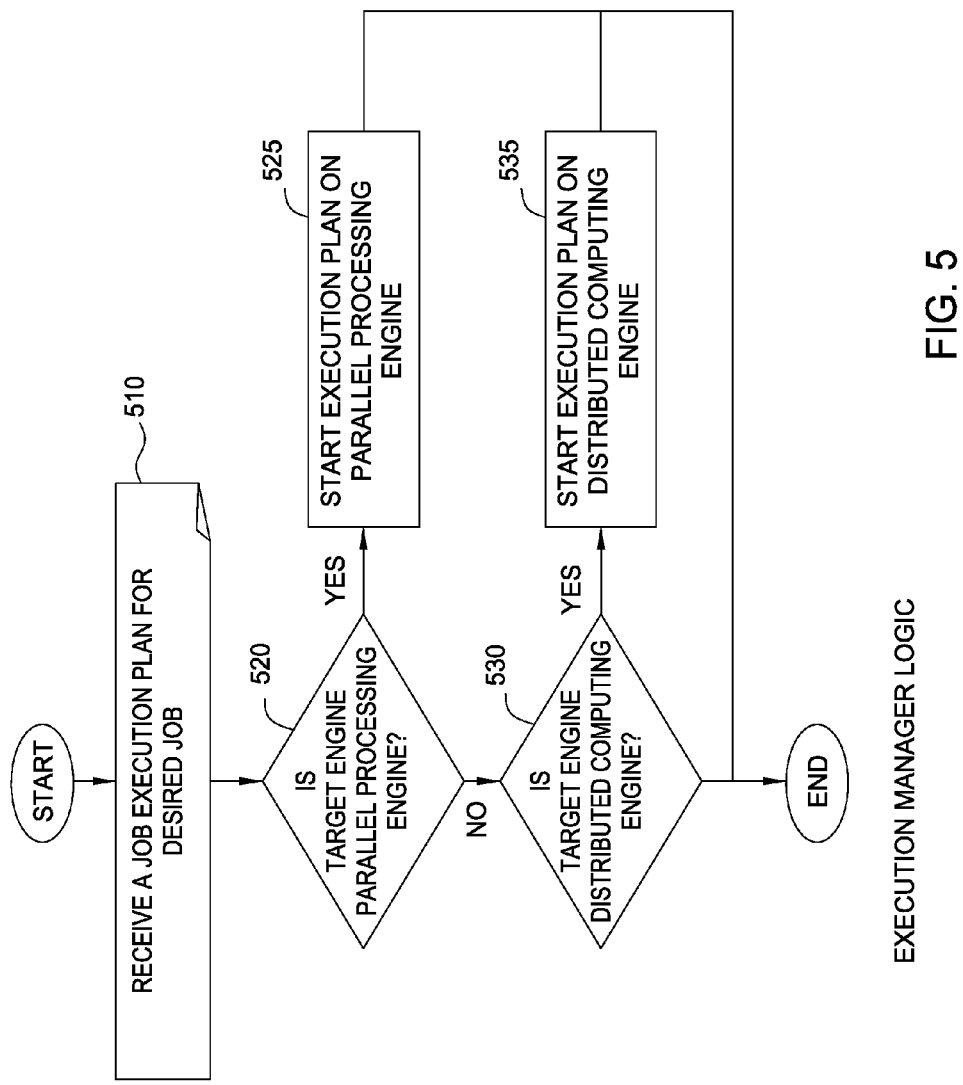
FIG. 5 is a flowchart depicting processing logic of an execution manager component of the application, according to one embodiment presented in this disclosure.

FIG. 5 is a flowchart 500 depicting processing logic of the execution manager 122 of FIG. 1, according to one embodiment presented in this disclosure. As shown, the flowchart 500 begins at step 510, where the execution manager 122 receives a job execution plan for the desired job. The execution manager 122 then determines the type of the target engine based on the job execution plan. If the target engine is the parallel processing engine (step 520), the execution manager 122 commences execution of the job execution plan on the parallel processing engine in the networked environment (step 525). On the other hand, if the target engine is the distributed processing engine rather than the parallel processing engine (530), then the execution manager 122 commences execution of the job execution plan on the distributed computing engine in the networked environment (step 535). After the steps 525 or 535 or if no matching processing engine is identified, the flowchart 500 ends.

Figure 6:
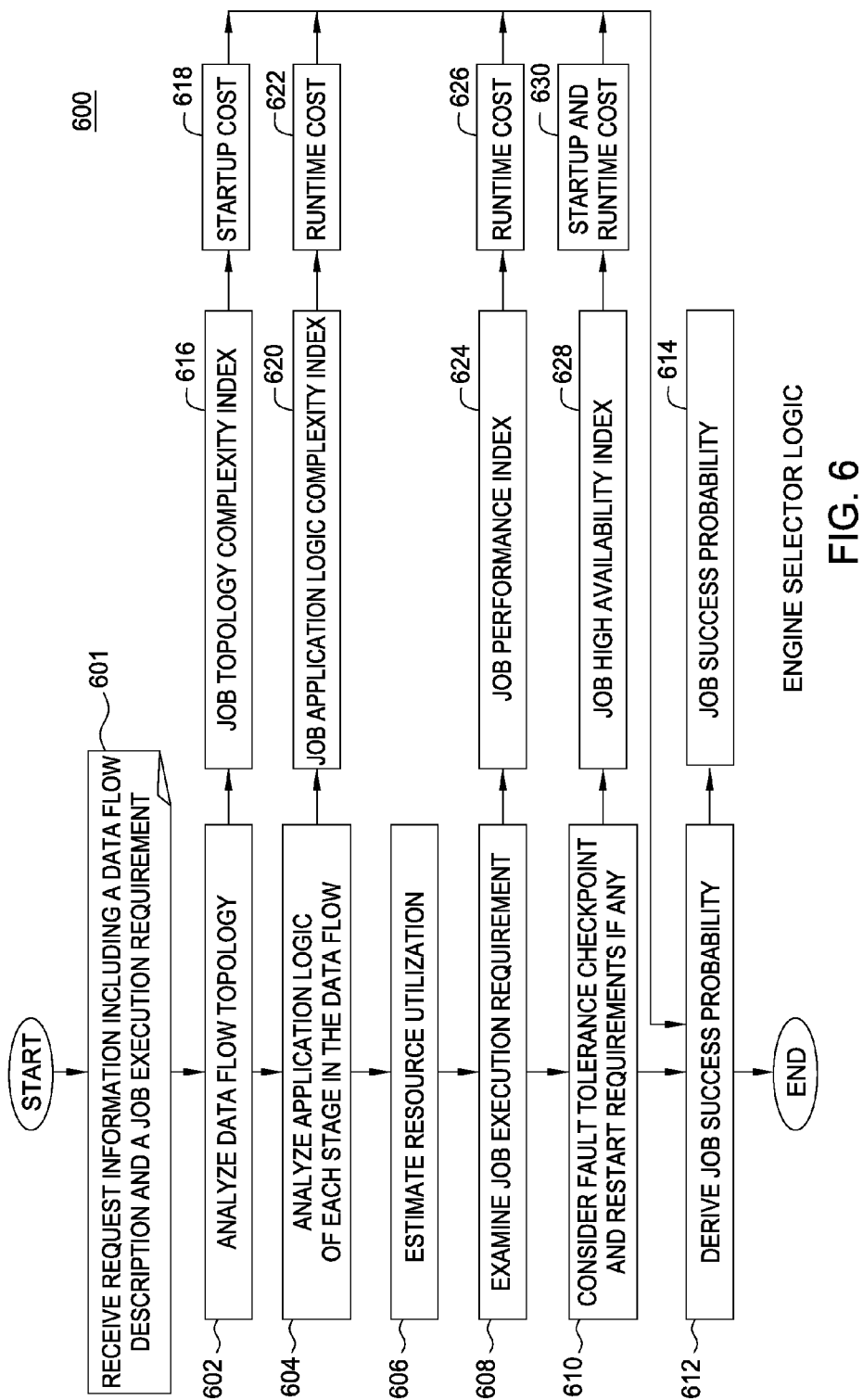
FIG. 6 is a flowchart depicting processing logic of an engine selector component of the application, according to one embodiment presented in this disclosure.

FIG. 6 is a flowchart 600 depicting processing logic of the engine selector 116 of FIG. 1, according to one embodiment presented in this disclosure. As shown, the flowchart 600 begins at step 601, where the engine selector 116 receives request information such as a data flow description, job execution requirements, etc. The engine selector 116 then selects a processing engine based on predefined criteria. At least in some embodiments, the predefined criteria may be a job success rate that is determined based on a decision matrix generated by the engine selector 116. In such embodiments, the processing engine having the highest job success rate is selected. Apart from the job success rate, the decision matrix may include four elements cover various factors associated with a job run request, where the factors may be static or dynamic. For example, as described above, the decision matrix may include the job topology complexity index, the job application complexity index, the job performance index, and the job high availability index.

In one embodiment, the engine selector 116 performs one or more of the following steps to generate the decision matrix. The engine selector 116 analyzes the data flow topology of the desired job (step 602) and application logic of each stage in the data flow (step 604). The engine selector 116 then estimates resource utilization associated with the desired job (step 606). The engine selector 116 then examines job execution requirements (step 608) and considers fault tolerance checkpoints and restart requirements, if any (step 610). In performing these steps, the engine selector 116 may determine one or more of a job topology complexity index 616, a job application logic complexity index 620, a job performance index 624, and a job high availability index 628. Depending on the embodiment, a single index of each type may be generated for a given job, or multiple indices of the same type may be generated for the available processing environment, each index specific to a different processing environment. Based on the generated indices, the engine selector 116 may generate one or more of a startup cost 618 associated with the job topology complexity index 616, a runtime cost 622 associated with the job application logic complexity index 620, a runtime cost 626 associated with the job performance index 624, and a startup and runtime cost 630 associated with the job high availability index 628. The engine selector 116 may then determine a job success rate 614 for each available processing environment, based on the decision matrix (step 612). After the step 612, the flowchart 600 ends.

In one embodiment, the job topology complexity index is determined as a predefined function of one or more of number of branches in the data flow of the desired job, the number of operators in each branch, the number of data sources, the number of data sinks, and the number of operators requiring intermediate storage. The job application logic complexity index is determined as a predefined function of one or more of the number of operators that require data be sorted and the number of operators which processing logic includes mapping, merging, aggregation, transformation, passthrough, etc. The job performance index is determined as a measure of estimated resource consumption and as a function of job statistics obtained from previous executions of the desired job. The job high availability index is determined based on whether a given processing engine supports fault tolerance and job restart. The elements of the decision matrix and the predefined functions may be tailored to suit the needs of a particular case.

FIG. 7 is a table 700 depicting predefined correlations 706 between elements of the decision matrix 702 and job success rate, according to one embodiment presented in this disclosure. The job success rate may be determined by the empirical model described above. In the table 700, the correlation between the job success rate and each element in the decision matrix is represented as a down arrow (↓) to indicate that the job success rate decreases and an up arrow (↑) to indicate that the success rate increases, when the each element of the decision matrix changes according to values 704. Accordingly, as shown by the values 704 and the correlations 706, the job success rate is inversely correlated with the job topology complexity index and the job application logic complexity index, respectively. Further, the job success rate is directly correlated with the job performance index and the job high available index, respectively. Further still, in some embodiments, the job high availability index may affect the other indices. For instance, in order to maintain high availability, a processing engine may in some cases need to incur input/output (I/O) costs from reading and writing data to and from storage before incurring processing costs in sending the data to the next process. Adding extra tasks for data transport increases the values of the job topology complexity index and the job application logic complexity index and decreases the value of the job performance index. The elements of the decision matrix and the correlations may be tailored to suit the needs of a particular case.

FIG. 8 depicts a data flow model 800 of a sequential job, according to one embodiment presented in this disclosure. At least in some embodiments, the data flow model 800 is a distributed processing data flow rather than a parallel processing data flow. As shown, the data flow model 800 has two data flow objects including a first operator 802 and a second operator 804. In one embodiment, to determine a job success rate of executing the data flow model 800, a model may first be generated based on the data flow model 800.

FIG. 9 depicts a job success rate model 900 for the data flow model 800 of FIG. 8, according to one embodiment presented in this disclosure. As shown, the job success rate model 900 includes multiple scenarios. The scenarios include a scenario 902 in which the first operator 802 succeeds, a scenario in which the first operator 802 fails, a scenario 906 in which the second operator 804 succeeds, and a scenario 908 in which the second operator 804 fails. Let $F_A$ represent the failure rate of the first operator 802, and let $F_B$ represent the failure rate of the second operator 804. In one embodiment, the success rate of the data flow as a whole may then be given by:

$$\text{SuccessRate} = (1 - F_A) * (1 - F_B) \quad \text{(Equation 1)}$$

In cases where an application is installed but is not running and hence cannot fail, the above model may be further expressed as:

$$\text{SuccessRate} = (1 - T_A/MTBF_A) * (1 - T_B/MTBF_B) \quad \text{(Equation 2)}$$

Where $T_A$ refers to total execution time of the first operator 802, $T_B$ refers to the total execution time of the second operator 804, $MTBF_A$ refers to the mean time between failures of operator A, and $MTBF_B$ refers to the mean time between failures of operator B. In some embodiments, there could be many causes of operator failure. For instance, a network switch may time out when an operator is making a network call, or the file system may hang when an operator is writing to the file system. In one embodiment, assuming that the environment is configured correctly and is in an operational state, the MTBF describes the expected time it takes, on average, for the operator to fail due to a hardware or software problem.

Figure 10:
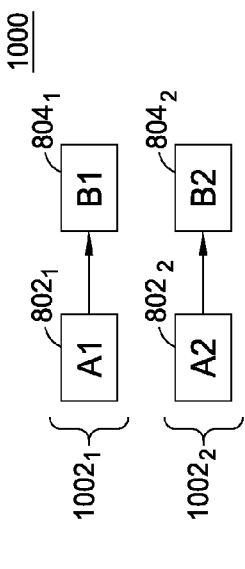
FIG. 10 depicts a job success rate model for parallel execution of two instances of the data flow model, according to one embodiment presented in this disclosure.

FIG. 10 depicts a job success rate model 1000 for parallel execution of two instances 1002 of the data flow model 800 of FIG. 8, according to one embodiment presented in this disclosure. Assume that the entire job is successful only if both pipelines are successful, each pipeline executing a separate instance 1002 of the data flow model. Assuming further that inputs are equally partitioned, then in one embodiment, the success rate for the entire job may be modeled as:

$$\text{SuccessRate} = 0.5 * (1 - T_{A1}/MTBF_A) * (1 - T_{B1}/MTBF_B) + 0.5 * (1 - T_{A2}/MTBF_A) * (1 - T_{B2}/MTBF_B) \quad \text{(Equation 3)}$$

In one embodiment, to generalize the above equation further, the job success rate for a data flow with n-way parallel equal partition may be modeled as:

$$\text{SuccessRate} = \Sigma 1/n * (1 - T_{Ai}/MTBF_A) * (1 - T_{Bi}/MTBF_B) \quad \text{(Equation 4)}$$

where i is from 1 to n.

Figure 11:
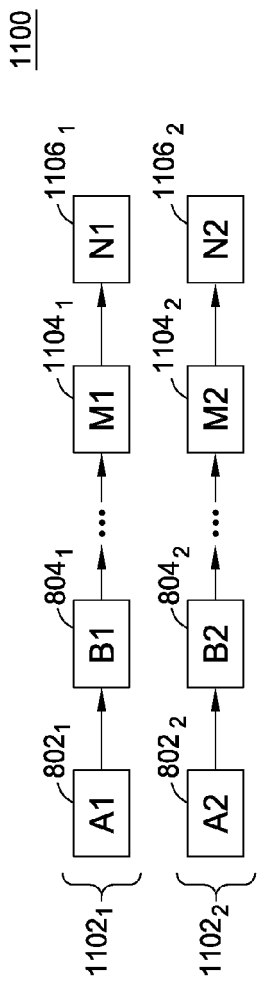
FIG. 11 depicts a job success rate model for parallel execution of two instances of the data flow model that further includes additional operators, according to one embodiment presented in this disclosure.

FIG. 11 depicts a job success rate model 1100 for parallel execution of two instances 1102 of the data flow model 800 that further includes additional operators, according to one embodiment presented in this disclosure. As shown, the additional operators may include at least operators 1104 and 1106. The job success rate model 1100 generalizes the number of operators in the data flow to an arbitrary number of operators N. In one embodiment, the job success rate may be given by:

$$\text{SuccessRate} = \Sigma 1/n * (1 - T_{Ai}/MTBF_A) * (1 - T_{Bi}/MTBF_B) * \ldots * (1 - T_{Ni}/MTBF_N) \quad \text{(Equation 5)}$$

Figure 12:
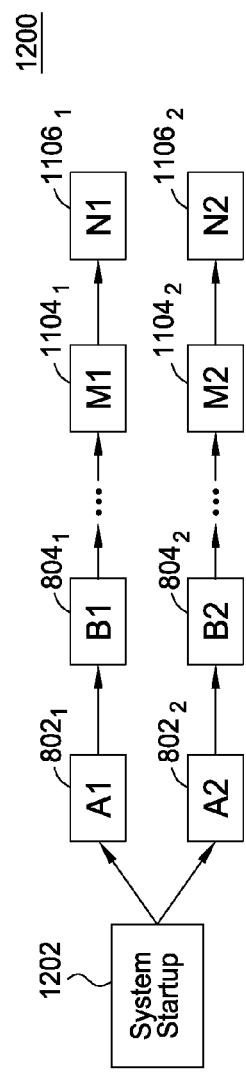
FIG. 12 depicts a job success rate model for parallel execution of two instances of the data flow model with a system startup element, according to one embodiment presented in this disclosure.

FIG. 12 depicts a job success rate model 1200 for parallel execution of two instances of the data flow model with a system startup element 1202, according to one embodiment presented in this disclosure. At least in some embodiments, a parallel processing engine has an initial startup phase, during which the parallel processing engine parses an Orchestrate Shell (OSH) script, invokes the score composer 120 to generate a parallel engine score to represent the parallel execution plan, and instantiates a network of processes on a set of nodes that form a parallel engine cluster for the parallel processing engine. The initial startup phase is represented as the system startup element 1202 in FIG. 12. After establishing all required processes, the data processing phase is entered. In one embodiment, the processes of different types include a conductor process, section leader processes, and player processes, which are communicatively organized into a hierarchy, with the conductor process as the root node in the hierarchy and with the player processes as leaf nodes in the hierarchy. At least in some embodiments, the player processes are also communicatively connected to one another. In order to more accurately model the job success rate, the potential startup failure is also taken into account. To this end, the job success rate may be expressed as:

$$\text{SuccessRate} = (1 - \text{StartupFailureRate}) * \Sigma 1/n * (1 - T_{Ai}/MTBF_A) * (1 - T_{Bi}/MTBF_B) * \ldots * (1 - T_{Ni}/MTBF_N) \quad \text{(Equation 6)}$$

FIG. 13 depicts a parallel engine data flow 1300, according to one embodiment presented in this disclosure. At least in some embodiments, a parallel engine data flow may contain any number of branches, each branch including a chain of operators of selected from a set of operators 1302. The success rate for each branch may be determined using the empirical model described above. The success rate for the entire parallel engine data flow 1300 may then be determined as the minimum success rate among all branches contained in the parallel engine data flow 1300. As shown, the parallel engine data flow 1300 merges and branches out at an operator $1302_3$. In one embodiment, the parallel engine data flow 1300 may be considered to include the following distinct branches:

TABLE I

Branches in the parallel engine data flow

Branch 1: {Op1, Op2, Op3, Op4, Op5, ..., OpN}
Branch 2: {Op1, Op2, Op3, OpK4, OpK5, ..., OpKn}
Branch 3: {OpK1, OpK2, Op3, Op4, Op5, ..., OpN}
Branch 4: {OpK1, OpK2, Op3, OpK4, OpK5, ..., OpKn}

The job success rate of the parallel engine data flow 1300 may be determined by performing a set of operations including identifying all the branches in the parallel engine data flow. The set of operations further includes determining a success rate for each branch using the empirical model described above. The set of operations further includes designating the minimum success rate among the branches as the job success rate for the parallel engine data flow 1300.

In one embodiment, the success rate for each branch in the parallel engine data flow may be determined based on a predefined algorithm. One such algorithm is illustrated in Table II.

TABLE II

Algorithm for identifying branches in the parallel engine data flow

1. Select an input data source operator that has not yet been searched.
2. Select one of output links that has not yet been checked.
3. Follow the output link to its consuming operator, marking the output link as checked.
4. If the current operator is a data sink or does not have any unchecked output links, go to step 6.
5. Repeat steps 2 to 4.
6. Start from the current operator.
7. Follow the most recently traversed input link to its producing operator.
8. If the producing operator has at least another consuming operator attached to it, go to that operator and repeat steps 2 to 7.
9. Repeat steps 7 to 8 until the input data source operator from step 1 is reached.
10. Repeat steps 2 to 9 until all output links of the input data source operator from step 1 are checked.
11. Mark the input data source operator as searched.
12. Unmark all links that are checked.
13. Repeat steps 1 to 12 until all input data source operators have been searched.

Hence, the job success rate of any parallel engine data flow may be determined more efficiently or conveniently at least in some cases. Further, the operations for determining the job success rate and for identifying branches may be tailored to suit the needs of a particular case.

FIG. 14 illustrates a data flow model 1400 for a distributed computing data flow, according to one embodiment presented in this disclosure. The data flow model 1400 is described in conjunction with the MapReduce model of Hadoop. As shown, the data flow model 1400 includes a map wrapper 1402 for a first operator and further includes a reducer wrapper 1404 for a second operator. In one embodiment, the map wrapper 1402 is a wrapper function for a map operation, while the reduce wrapper 1404 is a wrapper function for a reduce operation. Further, in one embodiment, the map operation accepts a series of key/value pairs, processes each pair, and generates zero or more output key/value pairs, while the reduce operation iterates through the values associated with each key and produces zero or more outputs. At least in some embodiments, the Hadoop framework performs additional tasks to manage input split, output serialization, replication, deserialization, etc.

FIG. 15 illustrates a data flow model 1500 that includes additional tasks performed for a distributed computing data flow, according to one embodiment presented in this disclosure. The additional tasks are represented by split operations 1502, sort operations 1504 and merge operations 1506. The Hadoop engine may include checkpoint/resume capability and speculative execution mode, such that if one task fails on one physical node, the failed task may be moved to a different node for retry. In some embodiments, the default replication factor of the file-system component of Hadoop, Hadoop Distributed File System (HDFS), may be configured to an arbitrarily high value, such that every job eventually succeeds unless each physical node in the cluster fails. Accordingly, in one embodiment, the job success rate for the Hadoop engine may be modeled as:

$$\text{SuccessRate}=1-F_1{}^*F_2{}^*\ldots{}^*F_n \qquad \text{(Equation 7)}$$

where Fi has a value range of (0, 1) and represents a failure rate of a physical node i.

Consequently, in one embodiment, distributed computing jobs, such as Hadoop jobs, may have a higher job success rate, because job failure often only occurs when all nodes fail, as compared to parallel processing jobs, where job failure occurs if any of the nodes fails. In one embodiment, the criteria used in selecting the appropriate processing engine further takes into consideration other factors such as a service level agreement associated with a requesting client, a hardware investment factor, a system response time factor, a job complexity factor, etc.

Figure 16:
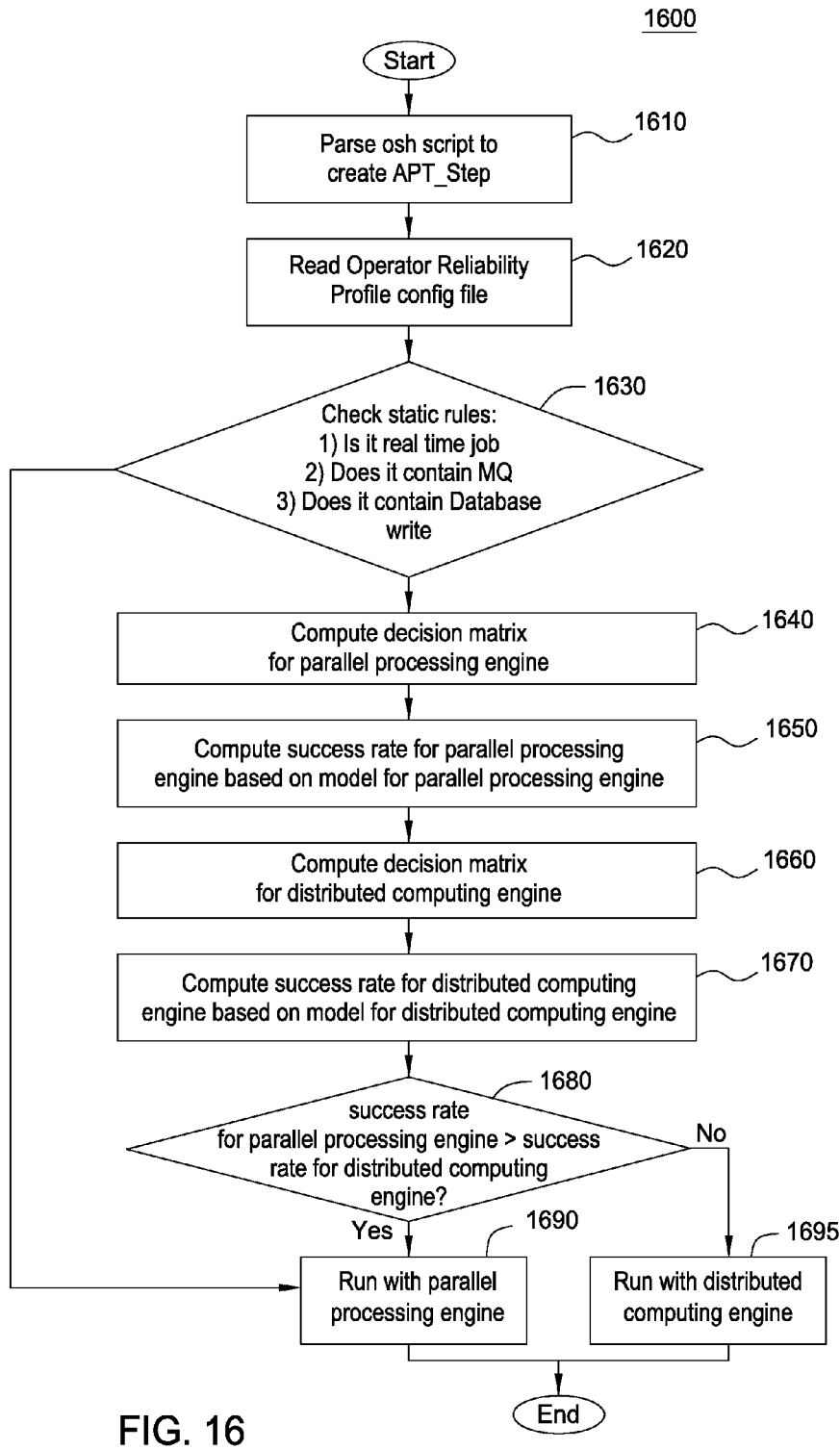
FIG. 16 is a flowchart depicting a method to determine an appropriate processing engine for a desired task, according to one embodiment presented in this disclosure.

FIG. 16 is a flowchart depicting a method 1600 to determine an appropriate processing engine for a desired task, according to one embodiment presented in this disclosure. As shown, the method 1600 begins at step 1610, where the application 108 reads a predefined script and builds a predefined object to represent the data flow. An example of the predefined script is an OSH script, while an example of a predefined object is an Applied Parallel Technologies step object, also referred to as an APT_Step object. At step 620, the application 108 reads a predefined configuration file, such as an operator reliability profile. In some embodiments, each operator not having any entry in the operator reliability profile is assumed to have a failure rate of $1*10^{-6}$. At step 1630, the application 108 evaluates the job against one or more predefined rules. To this end, the application 108 may determine whether the desired job is a real-time job that requires low latency, whether the desired job contains message queuing (MQ) (i.e., the data flow contains an MQ connector that requires guaranteed message delivery), and whether the desired job involves database writes. If so, the application 108 runs the data flow on the parallel processing engine (step 1690). Otherwise, the method 1600 proceeds to step 1640.

In one embodiment, for any other type of data flow, the application 108 may take into account resource utilization estimates, e.g., CPU utilization, total execution time for individual operators, I/O activity estimates, etc. Using the resource utilization estimates as input into the job success rate model for the parallel processing engine, in order to determine a job success rate. To this end, the application 108 may generate a decision matrix for the parallel processing engine (step 1640) and then computes a job success rate for the parallel processing engine using the empirical model described above (step 1650). The application 108 may then generate a decision matrix for the distributed computing engine (step 1660) and then computes a job success rate for the distributed computing engine and by using the empirical model described above (step 1670). The application 108 then determines which job success rate is higher (step 1680). If the job success rate for the parallel processing engine is higher, then the application 108 runs the desired job on the parallel processing engine (step 1690). On the other hand, if the job success rate of the distributed computing engine is higher, then the application 108 runs the desired job on the distributed computing engine (step 1695). After the step 1690 or 1695, the method 1600 terminates.

Although some embodiments are herein described in conjunction with parallel processing engines and distributed computing engines, other engine types are broadly contemplated. In this regard, the number and specific types of engines may also be tailored to suit the needs of a particular case. In cases where there are more than two available types of engines available, the application 108 selects the engine having a highest job success rate as determined via the steps described above, or via similar embodiments.

Figure 17:
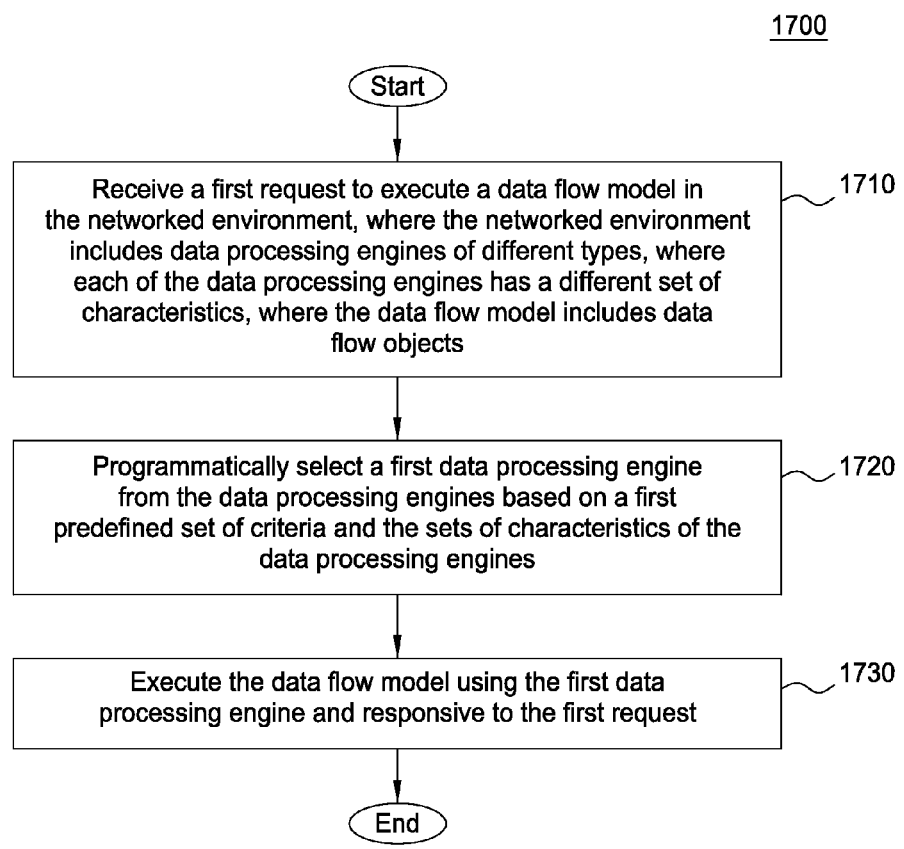
FIG. 17 is a flowchart depicting a method for data integration on retargetable engines in a networked environment, according to one embodiment presented in this disclosure.

FIG. 17 is a flowchart depicting a method 1700 for data integration on retargetable engines in a networked environment, according to one embodiment presented in this disclosure. As shown, the method 1700 begins at step 1710, where the application 108 receives a first request to execute a data flow model in the networked environment. The networked environment includes data processing engines of different types. Each of the data processing engines has a different set of characteristics. Further, the data flow model includes one or more data flow objects. At step 1720, the application 108 programmatically selects a first data processing engine from the data processing engines, based on a first predefined set of criteria and the sets of characteristics of the data processing engines. At step 1730, the application 108 executes the data flow model using the first data processing engine and responsive to the first request. After the step 1730, the method 1700 terminates.

Figure 18:
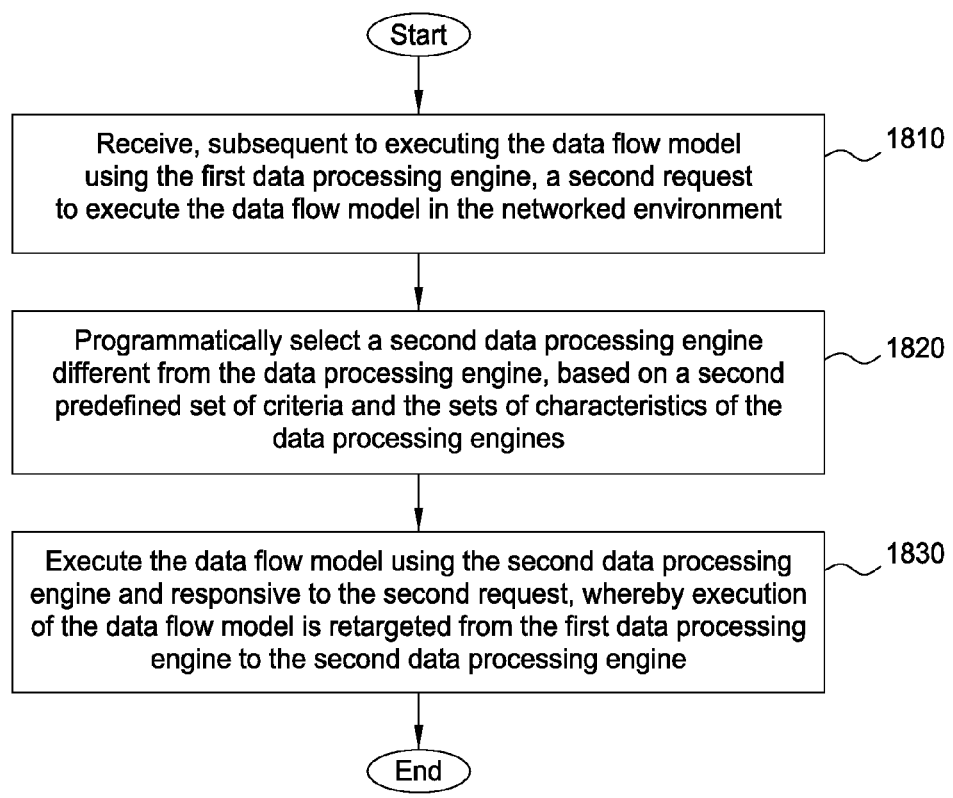
FIG. 18 is a flowchart depicting a subsequent method for data integration on retargetable engines in a networked environment, according to one embodiment presented in this disclosure.

FIG. 18 is a flowchart depicting a subsequent method 1800 for data integration on retargetable engines in a networked environment, according to one embodiment presented in this disclosure. As shown, the method 1800 begins at step 1810 where, subsequent to executing the data flow model using the first data processing engine, the application 108 receives a second request to execute the data flow model in the networked environment. At step 1820, the application 108 programmatically selects a second data processing engine of a different type than the first data processing engine, based on a second predefined set of criteria and the sets of characteristics of the data processing engines. At step 1830, the application 108 executes the data flow model using the second data processing engine and responsive to the second request. After the step 1830, the method 1800 terminates.

Accordingly, at least some embodiments disclosed herein provide techniques for data integration on retargetable engines in desired network environments, such as cloud computing environments. By selecting data processing engines based on the predefined criteria and according to the empirical models disclosed herein, data flows may be executed more efficiently at least in some cases—at least relative to alternative approaches that rely on other bases for selecting data processing engines. Examples of alternative approaches include approaches that do not consider the predefined criteria disclosed herein and approaches that rely on user input specifying a desired data processing engine to use.

In some embodiments, checkpointing techniques may be applied in order to resume processing at one or more defined checkpoints upon failure of a job, rather than restarting the job entirely. Parallel processing engines may scale linearly with the size of the input data, modulo Amdahl's law, which is used to find the maximum expected improvement to an overall system when only part of the system is improved. Checkpointing for such parallel processing engines, however, may often entail a high overhead. To overcome a need for checkpointing, one approach involves—assuming availability of resources—increasing a level of parallelism to shrink the time-window of processing to within acceptable bounds and then restarting any failed job without checkpointing. However, with the increasing complexity of processing environments, this approach may not necessarily be desirable in some cases. Software or hardware failures may occur with a higher frequency in such processing environments, which may often execute jobs on a cluster of hundreds of nodes, each with hundreds of cores.

Further, checkpointing techniques may be used by applications for purposes such as recovery and restart. Some checkpointing techniques involve suspending each process in order to save its state. The suspension time of a data flow program as a whole may be determined by the longest suspension time among all of the processes associated with the data flow program. Accordingly, such checkpointing techniques may adversely impact performance of the data flow program, especially if a particular process has a lengthy suspension time. Other approaches provide simultaneous independent checkpointing, in which each process may resume to a processing state once checkpointing of the respective process is complete. However, performing checkpointing independently on each process may be resource-intensive, especially for data flow jobs that process a large volume of data. Still other approaches adopt a "hammer" technique in which the data flow job is checkpointed by writing data to storage on each link in the data flow, also referred to herein as full checkpointing, which may also be resource-intensive at least in some cases. One example of such an approach is the MapReduce paradigm.

In some embodiments, rather than placing checkpoints at each link in a data flow, checkpoints are placed only for a subset of links in the data flow, also referred to herein as qualified checkpointing. The subset of links may include each link satisfying predefined checkpoint criteria, such as checkpointing overhead of the respective link, likelihood of failure at the respective link, etc. The checkpoint criteria may also include a predefined function of one or more criteria. Accordingly, checkpointing may occur only at those links having a low checkpointing overhead and/or that are more likely to exhibit failure.

At least in some embodiments, in addition to or as an alternative to using checkpointing to provide fault tolerance and recovery, checkpointing may also be used to optimize or at least improve data flow job performance. For example, in one embodiment, checkpointing may facilitate avoidance of performance degradation resulting from one or more bottlenecks in a data flow. When a bottleneck occurs at one or more links in the data flow, upstream data processing is pushed back, possibly all the back to input data sources even. In such a scenario, pipeline and data-partitioned parallelism no longer operates as desired. At least in some embodiments, this scenario may be prevented altogether or made less likely to occur by placing checkpoints at the links associated with the bottlenecks.

As another example, in one embodiment, checkpointing may also facilitate performing a test run on a partial data flow, also referred to herein as a subflow. At design time, a user may desire to group a specified part of a data flow into a subflow, run the subflow with specified data in order to test performance of the subflow, and modify the data flow accordingly based on results of the test run. In some embodiments, checkpoints may be used to connect a subflow to other subflows in the data flow. As a further example still, in one embodiment, checkpointing may facilitate running a data flow across different engines for specific processing needs. A data flow may include different types of processing logic, such as stream processing logic and data processing logic. Stream processing subflows may run more efficiently on a distributed processing engine, while data processing subflows may run more efficiently on a parallel processing engine. In some embodiments, using checkpoints to connect different subflows of a data flow allows the data flow to run across different processing engine types, improving the performance of the data flow at least in some cases.

Accordingly, at least some embodiments disclosed herein provide checkpoint-based data flow modeling techniques that can be used for one or more of improving performance of data flow jobs and recovering from data flow job failures. Rather than performing full checkpointing, which involves placing a checkpoint on each link of a data flow and which may increase resource consumption and reduce data flow performance, at least some techniques disclosed herein involve qualified checkpointing.

At least in some embodiments, qualified checkpointing may include placing checkpoints of one or more of the checkpoint types shown in Table III.

TABLE III

Example of different checkpoint types in qualified checkpointing retargetable checkpoint - connects two subflows of different processing types
connection checkpoint - connects two subflows having different design focus properties
parallel checkpoint - connects two subflows with increased pipeline parallelism
bottleneck checkpoint - connects an upstream subflow and an operator with a potential bottleneck
recovery checkpoint - connects an upstream subflow and an operator having a threshold likelihood of failing Further, as stated above, the techniques disclosed herein may be used to run: (i) a data flow across different types of engines to improve data processing efficiency; (ii) a partial data flow on retargetable engines for improved design considerations; (iii) multiple subflows in parallel to avoid bottlenecks and increase pipeline parallelism; and (iv) a failed job by recovering from the checkpoints.

As stated above, in qualified checkpointing, a subset of links may be selected based on predefined checkpoint criteria. In one embodiment, each checkpoint criteria may be evaluated at one or more levels of granularity, including the data flow level and the operator level. In some embodiments, the predefined checkpoint criteria include one or more of the criteria shown in Table IV.

TABLE IV

Example checkpoint criteria used in qualified checkpointing processing type of the job - e.g., stream processing, data processing, combined topology of the job and its current pipeline breaks, such as sorts and buffers -e.g., parallel subflows
input data consumption pattern of an operator and its processing logic - e.g., subflows having a potential bottleneck
job run information to determine operators likely to fail, e.g., database insert operators
amount of data that flows on a link - e.g., as a measure of cost of creating a checkpoint at the link At least in some embodiments, the cost of creating a checkpoint at a given link may generally be proportionally a size of the input data associated with the given link. Further, the job run information may also be referred to as operational metadata.

In some embodiments, the techniques disclosed herein may be used to identify subflows that run in parallel either on a single processing engine or on multiple retargetable engines—with one or more of increased pipeline parallelism and reduced bottleneck probability. Additionally or alternatively, the operational metadata may be used to calculate a probability of bottleneck or failure within a data flow. Further, one or more of data flow analysis, operational metadata, and cost of disk activity may be used to determine appropriate checkpoint placement. Further still, programmatically placing checkpoints according to the techniques disclosed herein and without requiring any user input may reduce resource consumption, reduce performance overhead, and/or improve efficiency of the data processing system in some cases, at least relative to alternative approaches, such as those in which full checkpointing is used.

As discussed above, in some embodiments, the application 108 is configured to consider an entire job as a unit and decide whether to run the job on a distributed computing engine, such as Hadoop, or on a parallel processing engine. In some other embodiments, the job is programmatically split into a set of smaller jobs, of which performance-centric jobs are executed on the distributed computed engine and I/O-centric jobs are executed on the parallel processing engine.

Figure 19:
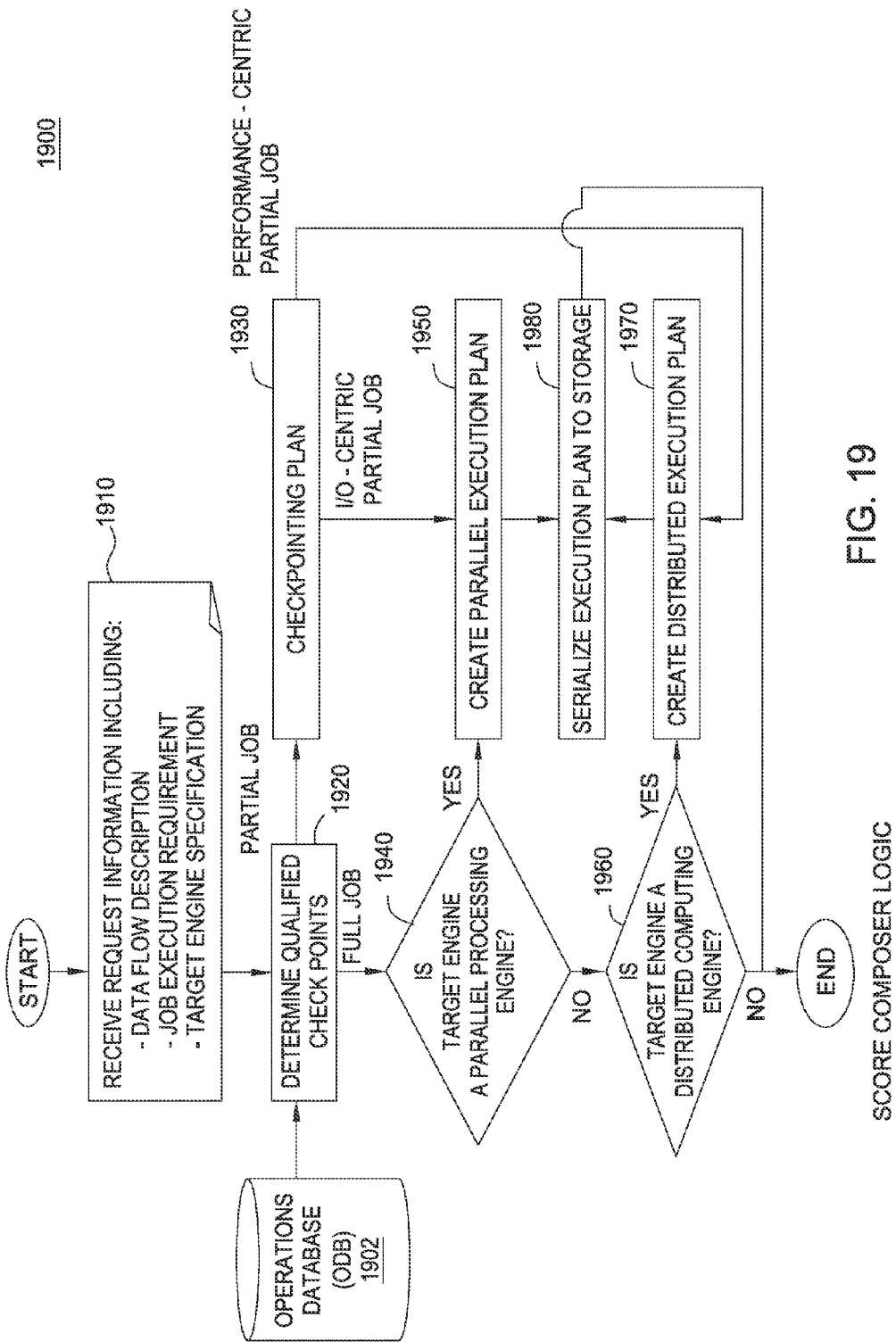
FIG. 19 is a flowchart depicting processing logic to generate qualified checkpoints by the score composer component of the application, according to one embodiment presented in this disclosure.

FIG. 19 is a flowchart 1900 depicting processing logic to generate qualified checkpoints by the score composer 120 of FIG. 1, according to one embodiment presented in this disclosure. At least in some embodiments, qualified checkpoints are generated at score composition time. As shown, the flowchart 1900 begins at step 1910, where the score composer 120 receives request information associated with a data flow of a desired job, such as a data flow description, job execution requirements, a target engine specification, etc. At step 1920, the score composer 120 generates one or more qualified checkpoints for the data flow. At least in some embodiments, the qualified checkpoints may be generated based on data retrieved from an operations database (ODB) 1902.

At step 1940, the score composer 120 determines whether the target engine of the desired job is the parallel processing engine. If so, the score composer 120 generates a parallel execution plan for the desired job (step 1950). On the other hand, if the score composer 120 determines that the target engine is the distributed processing engine rather than the parallel processing engine (step 1960), then the score composer 120 generates a distributed execution plan for the desired job (step 1970). The score composer 120 then serializes and stores the generated parallel or distributed execution plan to storage (step 1980).

Additionally or alternatively, after the step 1920, the score composer 120 may generate a checkpointing plan for the desired job or for one or more partial jobs created by the qualified checkpoints, where each partial job corresponds to a distinct subflow of the data flow (step 1930). The score composer 120 may generate a parallel execution plan for each partial job satisfying predefined parallel subflow criteria, such as the partial job being I/O-centric to a predefined threshold (step 1950). The score composer 120 may generate a distributed execution plan for each partial job satisfying predefined distributed subflow criteria, such as the partial job being performance-centric to a predefined threshold (step 1970). The score composer 120 may serialize the parallel or distributed execution plan for each partial job to storage (step 1980). At least in some embodiments, the checkpointing plan may be incorporated into the execution plan for each type of processing engine. After the step 1980 or if no processing engine is selected, the flowchart 1900 ends.

At least in some embodiments, the score composer 120 determines checkpoint placement at multiple levels of granularity including a data flow level and an operator level. At the data flow level of granularity, the score composer 120 analyzes the desired job to determine an appropriate division of the data flow into a set of subflows, based on predefined segmentation criteria. At the operator level of granularity, the score composer 120 retrieves operational metadata of previous executions of the desired job, in order to determine failure rates of individual operators in the data flow. The failure rates may then be used to identify appropriate locations for qualified checkpoints in order to provide the ability to recover from potential failures in executing the desired job.

Figure 20:
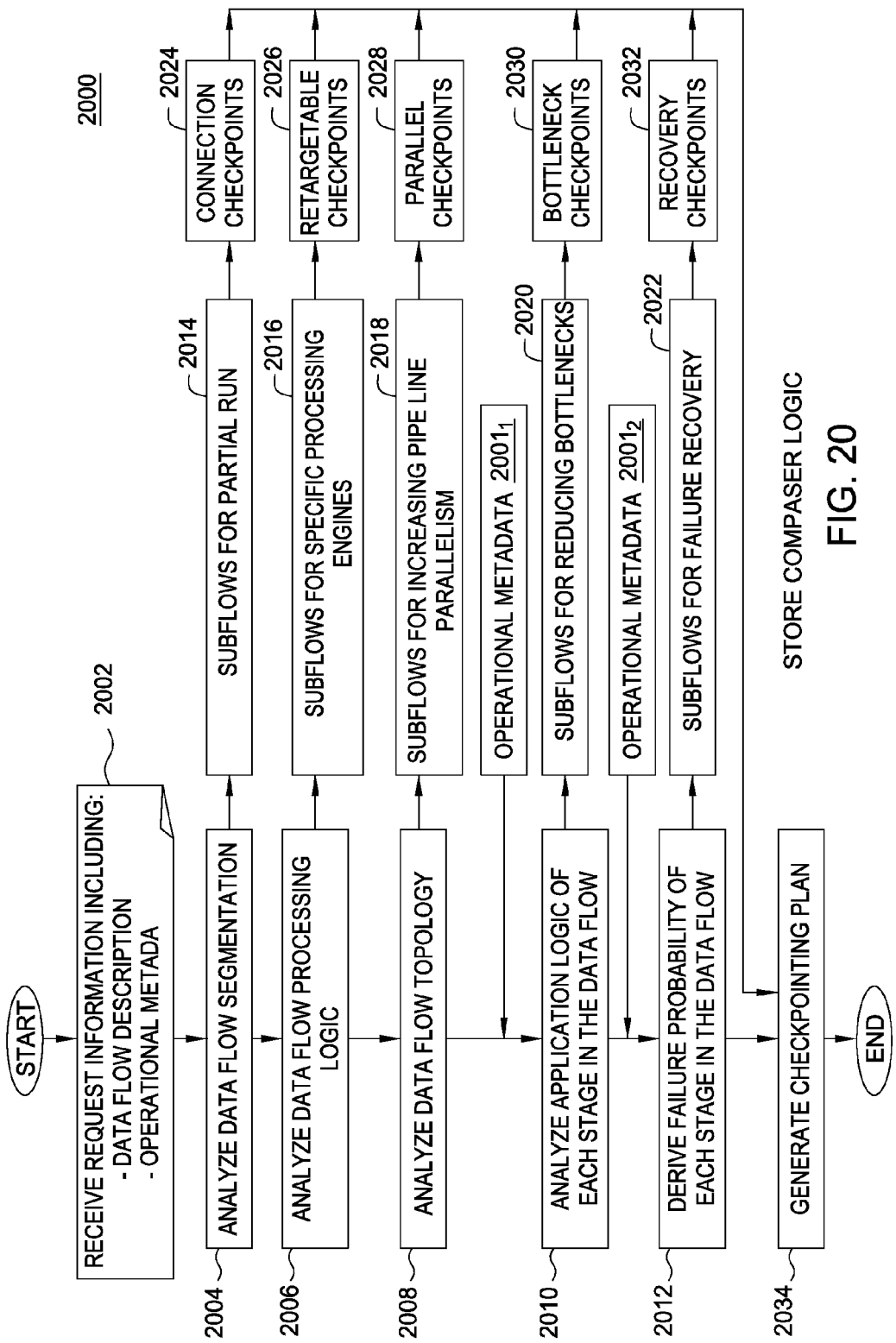
FIG. 20 is a flowchart depicting processing logic to generating a checkpointing plan by the score composer component of the application, according to one embodiment presented in this disclosure.

FIG. 20 is a flowchart 2000 depicting processing logic to generating a checkpointing plan by the score composer 120 of FIG. 1, according to one embodiment presented in this disclosure. As shown, the flowchart 2000 begins at step 2002, where the score composer 120 receives request information such as a data flow description, operational metadata, etc. In one embodiment, the score composer 120 performs one or more of the following steps to generate the checkpointing plan. The score composer 120 analyzes the data flow segmentation of the desired job (step 2004) and data flow processing logic of the desired job (step 2006). The score composer 120 then analyzes the data flow topology of the desired job (step 2008) and application logic of each stage in the data flow (step 2010). The score composer 120 then derives a failure probability of each stage in the data flow (step 2012). Depending on the embodiment, the step 2010 or the step 2012 may be performed based at least in part on received operational metadata 2001.

In one embodiment, based on the step 2004, the score composer 120 may identify subflows appropriate for partial runs (step 2014) and generate one or more connection checkpoints based on the identified subflows (step 2024). Additionally or alternatively, based on the step 2006, the score composer 120 may identify subflows appropriate for specific processing engines (step 2016) and generate one or more retargetable checkpoints based on the identified subflows (step 2026). Similarly, based on the step 2008, the score composer 120 may identify subflows appropriate for increased pipeline parallelism in processing the data flow (step 2018) and generate one or more parallel checkpoints based on the identified subflows (step 2028).

Further, in one embodiment, the score composer 120 may identify subflows appropriate for reducing bottlenecks in processing the data flow (step 2020) and generate one or more bottleneck checkpoints based on the identified subflows (step 2030). Further still, the score composer 120 may identify subflows appropriate for failure recovery when processing the data flow (step 2022) and generate one or more recovery checkpoints based on the identified subflows (step 2032). At least in some embodiments, each set of identified subflows may be determined based on respective criteria specific to the checkpoint type associated with the respective set of identified subflows. At step 2034, the score composer 120 may then generate a checkpointing plan for the data flow based on results from the above steps of the flowchart 2000. After the step 2034, the flowchart 2000 ends.

At least in some embodiments, one or more of the parallel processing engine and the distributed computing engine may also collect operational metrics when executing a desired job. Examples of operational metrics are shown in Table V.

TABLE V

Example operational metrics collected
when executing a desired job initialization time
input record count
input throughput
output record count
output throughput
CPU usage of each operator
memory usage of each operator
disk space usage of each operator
job status (e.g., successful, failed, warning, etc.)
individual operator status (e.g., successful, failed, warning, etc.)

In some embodiments, the score composer 120 may then use one or more of the collected operational metrics in generating qualified checkpoints for the data flow of the desired job.

As stated above, in one embodiment, the score composer 120 may generate different types of checkpoints, such as retargetable checkpoints, connection checkpoints, parallel checkpoints, bottleneck checkpoints, and recovery checkpoints, at a data flow level of granularity. In some alternative embodiments, the recovery checkpoints are not determined at the data flow level of granularity but only at an operator level of granularity.

Figure 21:
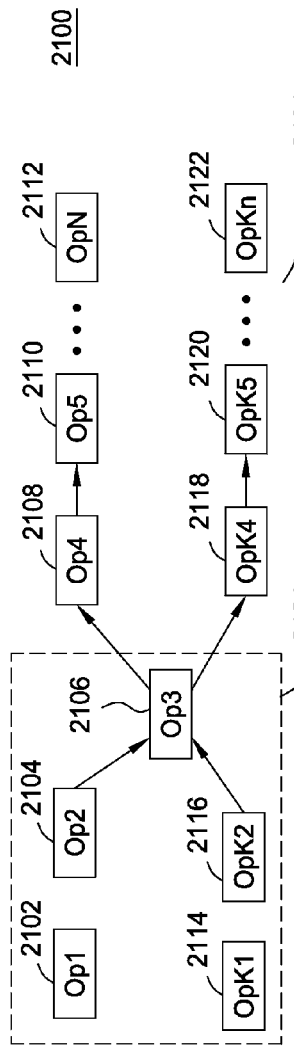
FIG. 21 illustrates usage of connection checkpoints in a data flow, according to one embodiment presented in this disclosure.

FIG. 21 is a diagram 2100 illustrating usage of connection checkpoints in a data flow 2101, according to one embodiment presented in this disclosure. Assume that an end-user is designing the data flow 2101 via a graphical user interface (GUI) of a predefined data flow tool configured according to the embodiments disclosed herein. The data flow 2101 includes multiple branches and operators 2102-2122. Assume further that the end-user desires to run a partial data flow 2124, including at least operators upstream of the operator 2106. In this scenario, the end-user may select, via the GUI, only the operators 2102, 2104, 2114, 2116, and 2106 and specify to group the selected operators into a subflow. In response, connection checkpoints in the data flow may be generated for the end-user.

Figure 22:
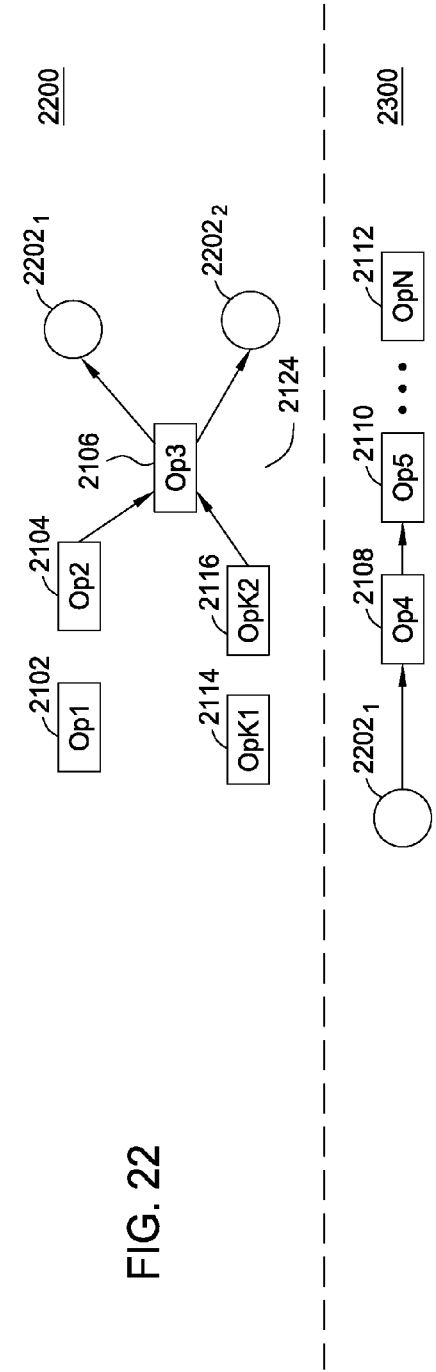
FIG. 22 illustrates a subflow and connection checkpoints generated for the data flow, according to one embodiment presented in this disclosure

FIG. 22 is a diagram 2200 illustrating the subflow 2124 and connection checkpoints 2202 generated in the data flow 2101 of FIG. 21, according to one embodiment presented in this disclosure. As shown, the subflow 2124 includes only the operators 2102, 2104, 2114, 2116, and 2106 specified by the end-user of the data flow tool. Further, the operator 2106 in the subflow 2124 is connected to two connection checkpoints $2202_{1-2}$. In one embodiment, the end-user may also specify to run the remainder of the data flow.

Figure 23:
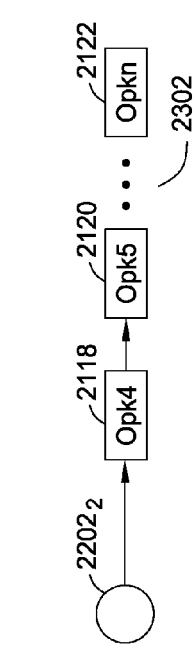
FIG. 23 illustrates a subflow corresponding to a remainder of the data flow, according to one embodiment presented in this disclosure.

FIG. 23 is a diagram 2300 illustrating a subflow 2302 corresponding to the remainder of the data flow 2101 of FIG. 21, according to one embodiment presented in this disclosure. As shown, the subflow 2302 begins at the two connection checkpoints $2202_{1-2}$. The subflow 2302 further includes at least three operators 2108, 2110, 2112 downstream of the first connection checkpoint $2202_1$. The subflow 2302 also includes at least three operators 2118, 2120, 2122 downstream of the second connection checkpoint $2202_2$. Upon the end-user specifying to run the remainder of the data flow, the subflow 2302 may be executed.

Figure 24:
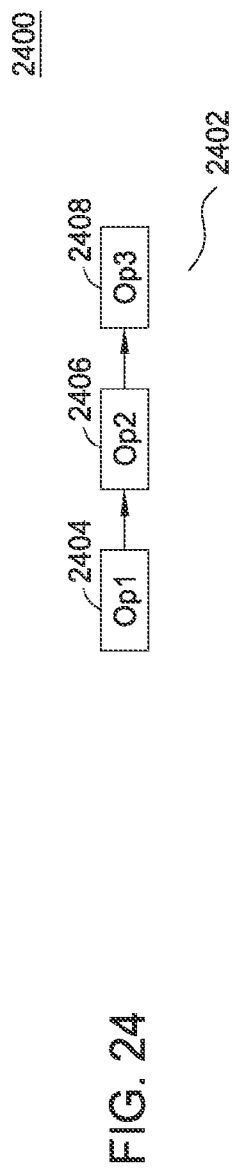
FIG. 24 illustrates usage of retargetable checkpoints in a data flow, according to one embodiment presented in this disclosure.

FIG. 24 is a diagram 2400 illustrating usage of retargetable checkpoints in a data flow 2402, according to one embodiment presented in this disclosure. Assume that the end-user is designing the data flow 2402 to import a large number of files from HDFS, transform data in the files, and save the transformed data back to HDFS. In one embodiment, the data flow 2402 includes three operators 2404, 2406, 2408 corresponding to the import, transform, and save operations, respectively. At least in some embodiments, the data flow 2402 may be divided into at least three subflows. A first of the subflows may run on the distributed competing engine to import data from HDFS. A second of the subflows may run on the parallel processing engine to transform the data. A third of the subflows may run on the distributed computing engine to export the transformed data to HDFS.

Figure 25:
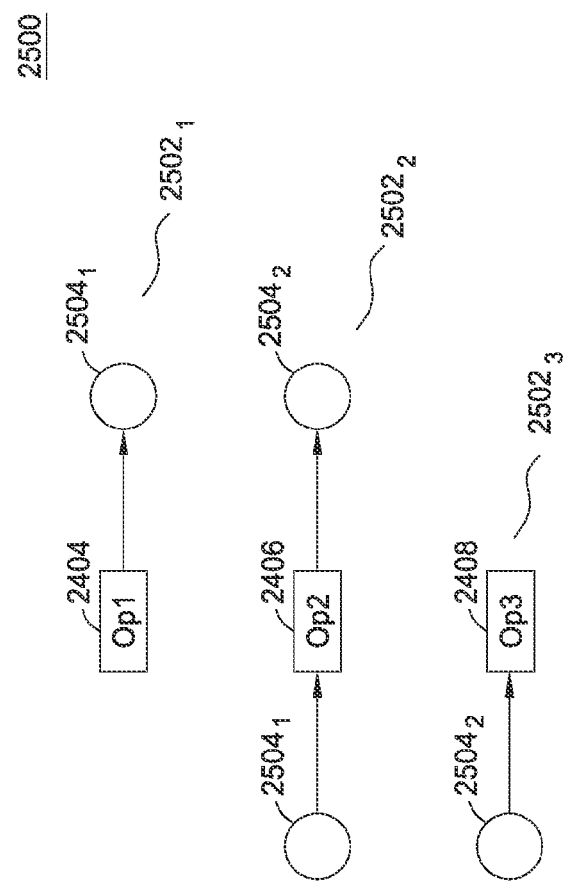
FIG. 25 illustrates subflows into which the data flow is divided, according to one embodiment presented in this disclosure.

FIG. 25 is a diagram 2500 illustrating subflows 2502 into which the data flow 2402 of FIG. 24 is divided, according to one embodiment presented in this disclosure. As shown, a first $2502_1$ of the subflows, which is configured to import data from HDFS, includes the operator 2404 and a first retargetable checkpoint $2504_1$. A second $2502_2$ of the subflows, which is configured to transform the data on the parallel processing engine, includes the first retargetable checkpoint $2504_1$, the operator 2406, and a second retargetable checkpoint $2504_2$. A third $2502_3$ of the subflows, which is configured to export the transformed data to HDFS, includes the second retargetable checkpoint $2504_2$ and the operator 2408. As stated above, these subflows $2502_{1-3}$ may be executed across processing engines of different types, thereby improving efficiency of job processing at least in some cases.

Figures 26, 27:
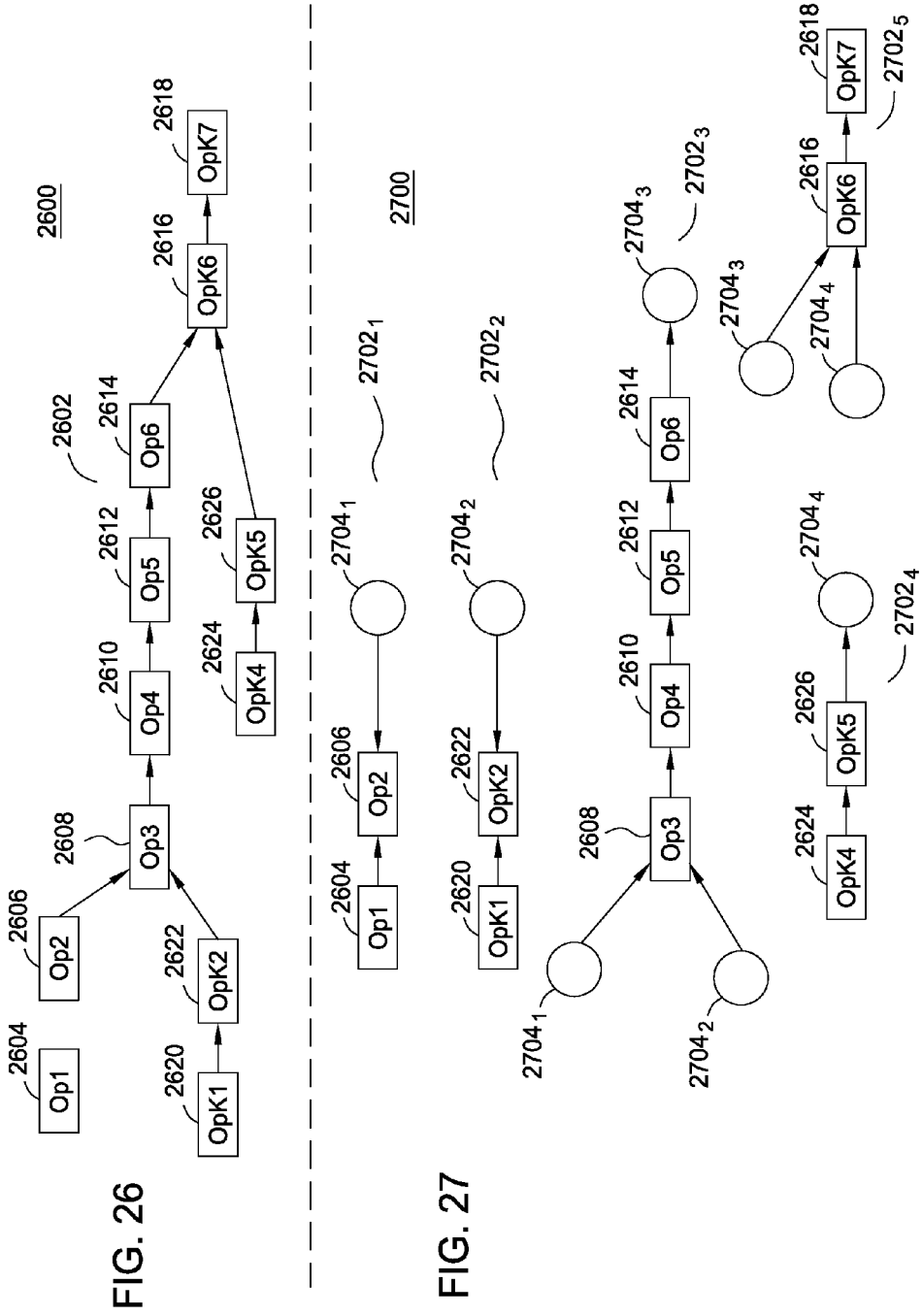
FIG. 26 illustrates usage of parallel checkpoints in a data flow, according to one embodiment presented in this disclosure.
FIG. 27 illustrates subflows into which the data flow is divided, according to one embodiment presented in this disclosure.

FIG. 26 is a diagram 2600 illustrating usage of parallel checkpoints in a data flow 2602, according to one embodiment presented in this disclosure. In this particular example, the data flow 2602 includes twelve operators 2604-2618 and five branches. In one embodiment, parallel checkpoints may be placed in the data flow 2602, to connect five different subflows of the data flow 2602. The subflows may then be executed in parallel to increase pipeline parallelism at least in some cases.

FIG. 27 is a diagram 2700 illustrating subflows 2702 into which the data flow 2602 of FIG. 26 is divided, according to one embodiment presented in this disclosure. As shown, a first $2702_1$ of the subflows includes the operators 2604, 2606 and a first parallel checkpoint $2704_1$. A second $2702_2$ of the subflows includes the operators 2620, 2622 and a second parallel checkpoint $2704_2$. A third $2702_3$ of the subflows includes the first and second parallel checkpoints $2704_{1-2}$, the operators 2608-2614, and a third parallel checkpoint $2704_3$. A fourth $2702_4$ of the subflows includes the operators 2624, 2626 and a fourth parallel checkpoint $2704_4$. A fifth $2702_5$ of the subflows includes the third and fourth parallel checkpoints $2704_{3-4}$ and the operators 2616, 2618. As stated above, these subflows $2702_{1-5}$ may be executed in parallel to increase pipeline parallelism at least in some cases.

Figure 28:
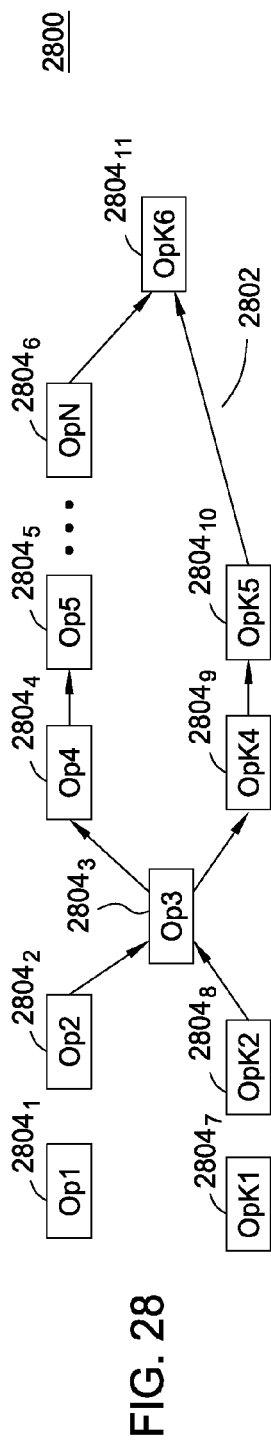
FIG. 28 illustrates a data flow having a potential bottleneck, according to one embodiment presented in this disclosure.

FIG. 28 is a diagram 2800 illustrating a data flow 2802 having a potential bottleneck, according to one embodiment presented in this disclosure. As shown, the data flow 2802 includes at least eleven operators $2804_{1-11}$. Assume that the data flow 2802 contains a fork join pattern between the operator $2804_3$ and the operator $2804_{11}$. The operator $2804_{11}$ may generate an output record using an input record from each input link. Assume further that the lower branch of the fork join pattern runs significantly faster than the upper branch of the fork join pattern. Thus, the records generated by the operator $2804_{10}$ may not necessarily be consumed at the same speed as the upstream operators. This may slow down record processing of the operators $2804_{2,3,8}$ and eventually the operators $2804_{1,7}$ also. The entire data flow 2802 runs into a bottleneck between the operators $2804_{10,11}$. In one embodiment, a bottleneck checkpoint may then be generated between the operators $2804_{10,11}$.

Figure 29:
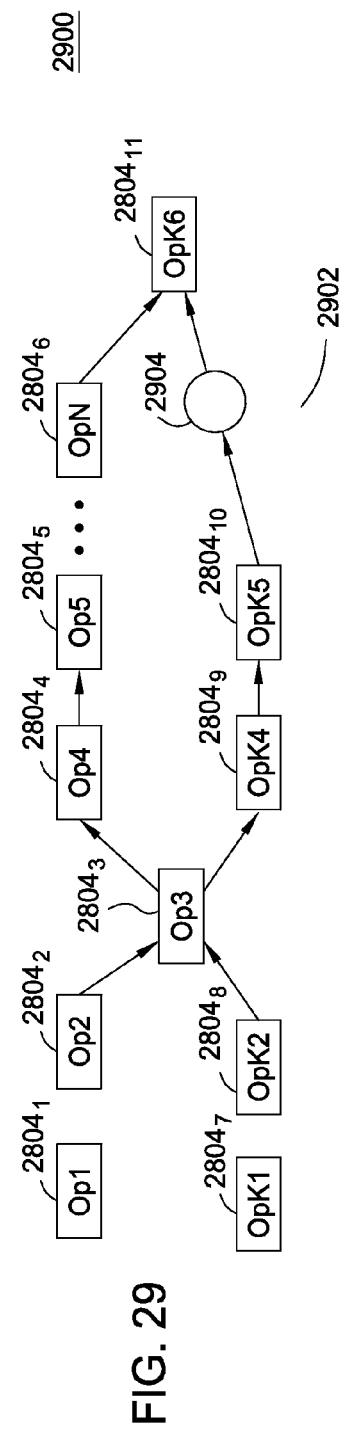
FIG. 29 illustrates usage of bottleneck checkpoints in a data flow, according to one embodiment presented in this disclosure.

FIG. 29 is a diagram 2900 illustrating usage of bottleneck checkpoints in a data flow 2902, according to one embodiment presented in this disclosure. The data flow 2902 corresponds to the data flow 2802 of FIG. 28 and includes a bottleneck checkpoint 2904 between the operators $2804_{10,11}$. The bottleneck checkpoint 2904 is generated in response to identifying that a bottleneck exists between these operators $2804_{10,11}$.

As stated above, in one embodiment, the score composer 120 may also generate different types of checkpoints, such as retargetable checkpoints, connection checkpoints, parallel checkpoints, bottleneck checkpoints, and recovery checkpoints, at an operator level of granularity. Further, as stated above, in some alternative embodiments, the recovery checkpoints are only determined at the operator level of granularity and not at the data flow level of granularity.

In one embodiment, in some distributed computing engines such as Hadoop, jobs are modeled as a simple flow of a mapper process to a reducer process. The output of the mapper process may be serialized to HDFS before invoking the reducer process. In doing so, the reducer process may be re-executed in event of failure. Further, if a node fails, a new reducer process may be launched on a different node to process the same set of data.

FIG. 30 is a diagram 3000 illustrating a data flow 3002 that involves persisting a large amount of data to disk, according to one embodiment presented in this disclosure. As described above, full checkpointing may often be costly and resource-intensive. As shown, the data flow 3002 includes five operators $3004_{1-5}$. Assume that the first operator $3004_1$ reads one hundred gigabytes of data from an external source such as a database or a flat file. Assume further that each operator 3004 at least slightly increases the size of the input to the next operator in succession. At least in some embodiments, using the Hadoop engine, which has a default replication factor of three, intermediate checkpoint data sets $3006_{1-4}$ of at least three hundred gigabytes in size would result at each link between the operators $3004_{1-5}$.

In one embodiment, the following formula may be used to estimate usage of temporary storage space by a data flow, also referred to herein as scratch disk space:

$$\text{scratch disk space} = N * R * S \quad \text{(Equation 8)}$$

In Equation 18, N represents the number of links in the data flow, R represents the replication factor of the processing engine, and S represents the size of the initial input data to the data flow. Based on the above equation, the intermediate checkpoint data sets $3006_{1-4}$ would total an estimated twelve hundred gigabytes in scratch disk space. Thus, it may be costly to execute the data flow, especially in scenarios where the size of the initial input data is even greater. In some embodiments, persisting such large data sets on disk not only significantly increases storage costs but also adds significant processing overhead, which may severely impact application performance at least in some cases. The utility of the cluster system may also be undermined as a result of significant processing time devoted to writing checkpointing information to facilitate executing the job as opposed to devoting processing time solely to executing the job and producing an output.

Accordingly, selectively placing qualified checkpoints in the data flow may reduce the overhead of checkpointing, lower the storage costs, and improve application performance at least in some cases—all while maintaining the same or a similar level of service that is provided by other approaches such as full checkpointing. In some embodiments, the qualified checkpoints may be placed at an operator level of granularity based on predefined operator checkpoint criteria. In one embodiment, the operator checkpointing criteria may include one or more of whether a given operator is stateful or stateless, an individual failure rate of the given operator, and a buffer usage pattern of the given operator. In some embodiments, the operator checkpointing criteria may include a predefined function of one or more of these criteria. The predefined function may assign a distinct weight to each criterion.

FIG. 31 is a diagram 3100 illustrating a data flow 3102 in context of determining whether an operator is stateful, according to one embodiment presented in this disclosure. As shown, the data flow 3102 includes two operators $3104_{1-2}$ and a link 3106 therebetween. At least in some embodiments, an operator is stateful if its state is affected by input records. For instance, an operator configured to calculate a moving average is stateful because an incoming record may change the moving average calculation. On the other hand, in some embodiments, an operator is stateless if its state is not affected by input records. For instance, an operator configured to calculate the sum of two columns in a given input record and output the input record along with the sum is stateless, because the output resulting from the given input record has no relationship with any input record previously received by the operator. Accordingly, in one embodiment, the state of the link 3106 in the data flow 3102 is determined by the respective states of the operators $3104_{1-2}$ according to predefined state determination rules.

FIG. 32 is a table 3200 illustrating state determination rules 3201 for data flows, according to one embodiment presented in this disclosure. As shown, the table 3200 includes columns 3202-3206 representing states of the first operator $3104_1$, the second operator 31042, and the link therebetween, respectively. As shown, a first of the state determination rules 3201 indicates that the link is stateful if the operators $3104_{1-2}$ are both stateful. A second and a third of the state determination rules 3201 indicate that the link is stateful if either one of the operators $3104_{1-2}$ are stateful. A fourth of the state determination rules 3201 indicates that the link is stateless if both of the operators $3104_{1-2}$ are stateless. At least in some embodiments, the score composer 120 refrains from checkpointing any link that is stateless. In alternative embodiments, whether a link is stateful is a criterion taken into account by the score composer 120, in conjunction with other operator checkpoint criteria, in determining whether to checkpoint a given link. In one embodiment, each operator may be configured to include an application programming interface (API) to report a Boolean value indicating whether the respective operator is stateful. Doing so may at least in some cases facilitate determining whether links throughout a given data flow are stateful. The state determination rules and columns may be tailored to suit the needs of a particular case.

At least in some embodiments, one or more types of runtime operational aspects of job run metadata may be collected. Examples of runtime operational aspects are shown in Table VI.

TABLE VI

Example runtime operational aspects of job run metadata start time of a desired job
stop time of the desired job
input throughput of the desired job
total number of input datasets to the desired job
output throughput of the desired job
total number of output datasets from the desired job
CPU usage associated with the desired job
memory usage associated with the desired job
storage usage associated with the desired job
whether a given operator in the desired job succeeded or failed In one embodiment, the score composer 120 may determine a success rate of each operator in the data flow, based on the collected runtime operational aspects. The success rate of a given operator may be determined as a predefined function of one or more of the collected runtime operational aspects. Further, in one embodiment, the success rate of a given link may be determined as follows:

$$SuccessRate_{datalink} = SuccessRate_{op1} * SuccessRate_{op2} \quad \text{(Equation 9)}$$

Figure 33:
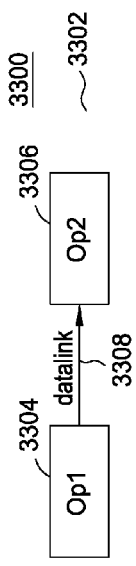
FIG. 33 illustrates a data flow in context of determining a link success rate, according to one embodiment presented in this disclosure.

FIG. 33 is a diagram 3300 illustrating a data flow 3302 in context of determining a link success rate, according to one embodiment presented in this disclosure. As shown, the data flow 3302 includes two operators 3304, 3306 and a link 3308 therebetween. In this particular example, $SuccessRate_{op1}$ in Equation 9 represents a success rate determined for the first operator 3304 in the data flow 3302. Further, $SuccessRate_{op2}$ represents a success rate determined for the second operator 3306. Further still, $SuccessRate_{datalink}$ represents a success rate determined for the link 3308 in the data flow 3302. In data flows having greater numbers of operators and links, the techniques disclosed herein may be similarly applied to determine a success rate of each link in the data flow. At least in some embodiments, links not satisfying a threshold minimum rate associated with a desired service level are checkpointed. The threshold minimum rate may be higher for a higher, desired level of service. In alternative embodiments, the success rate of a given link is taken into account by the score composer 120, in conjunction with other operator checkpoint criteria, in determining whether to checkpoint the given link. Additional details pertaining to determining success rates are discussed above in conjunction with empirical modeling techniques.

As stated above, in one embodiment, the operator checkpointing criteria may include a buffer usage pattern of the given operator. At least in some embodiments, any operator configured to perform an amount of buffering exceeding a predetermined threshold may be considered a candidate for a qualified checkpoint. For instance, in some embodiments, a sort operator may only sort data after having received a complete input data set. If any error occurs while awaiting the input data set, the entire job may need to be restarted. On the other hand, if the input data set is checkpointed, then upon restart, the sort operation may begin processing using the data set in storage. As another example, a de-duplication operator may also require buffering of all input data before sorting and removing duplicate records based on a specified key. Accordingly, the de-duplication operator may also be a candidate for a qualified checkpoint based on buffer usage pattern. At least in some embodiments, the buffer usage pattern of a given link is a criterion taken into account by the score composer 120, in conjunction with other operator checkpoint criteria, in determining whether to checkpoint the given link.

Figure 34:
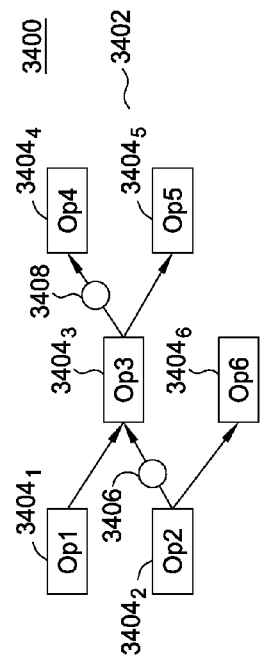
FIG. 34 illustrates a data flow in context of connecting subflows using qualified checkpoints, according to one embodiment presented in this disclosure.

FIG. 34 is a diagram 3400 illustrating a data flow 3402 in context of connecting subflows using qualified checkpoints, according to one embodiment presented in this disclosure. As shown, the data flow 3402 includes six operators $3404_{1-6}$. Assume that checkpoints are placed in the data flow 3402 based on the operator checkpointing criteria discussed above. For instance, assume that using the techniques disclosed herein, the link between the operators $3404_{2,3}$ has a high failure rate resulting from lengthy processing times. Assume further that the link between the operators $3404_{3,4}$ requires a large amount of buffering to mitigate a potential bottleneck. In one embodiment, a recovery checkpoint 3406 may be placed between the operators $3404_{2,3}$, while a bottleneck checkpoint 3408 may be placed between the operators $3404_{3,4}$. In some embodiments, once the checkpoints are placed in the data flow 3402, the data flow 3402 may then be divided into subflows.

Figure 35:
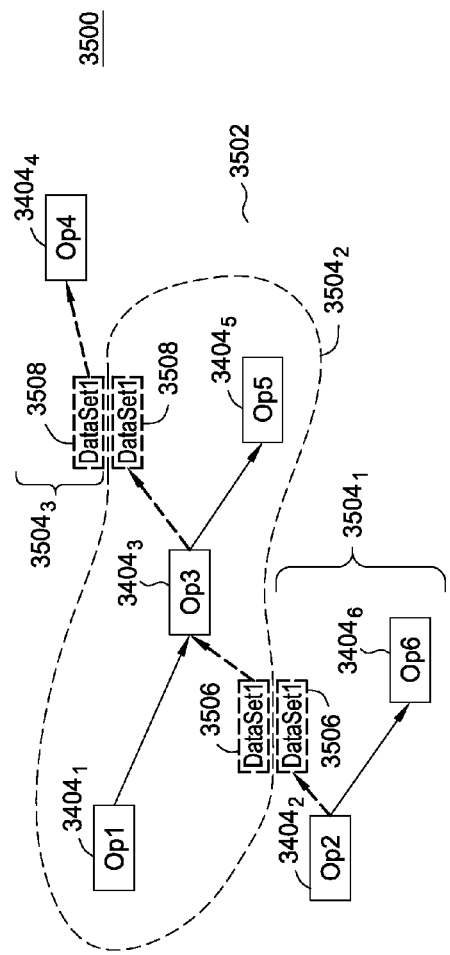
FIG. 35 illustrates subflows into which the data flow is divided, according to one embodiment presented in this disclosure.

FIG. 35 is a diagram 3500 illustrating subflows 3504 into which the data flow 3402 of FIG. 34 is divided, according to one embodiment presented in this disclosure. As shown, a first $3504_1$ of the subflows includes the operators $3404_{2,6}$ and outputs a first data set 3506. A second $3504_2$ of the subflows includes the operators $3404_{1,3,5}$, receives the first data set 3506 as input, and outputs a second data set 3508. A third $3504_3$ of the subflows includes the operator $3404_4$ and receives the second data set 3508 as input. In some embodiments, due to the dependencies between the subflows $3504_{1-3}$ in terms of the data sets 3506, 3508, the subflows may be executed in a particular order as determined by predefined subflow ordering rules. For example, in a particular embodiment, the first subflow $3504_1$ may be executed first in time, followed by the second subflow $3504_2$, and then in turn followed by the third subflow $3504_3$. In other embodiments where splitting a given data flow results in one or more subflows having no interdependencies, such subflows may be run in parallel. Further, in embodiments involving CPU-intensive sub-flows, additional partitions may be created by reconfiguring the parallel processing engine to facilitate execution of the sub-flows. Further, other embodiments are broadly contemplated. For example, data segmentation techniques may also be applied for data storage and retrieval at qualified checkpoints.

Figure 36:
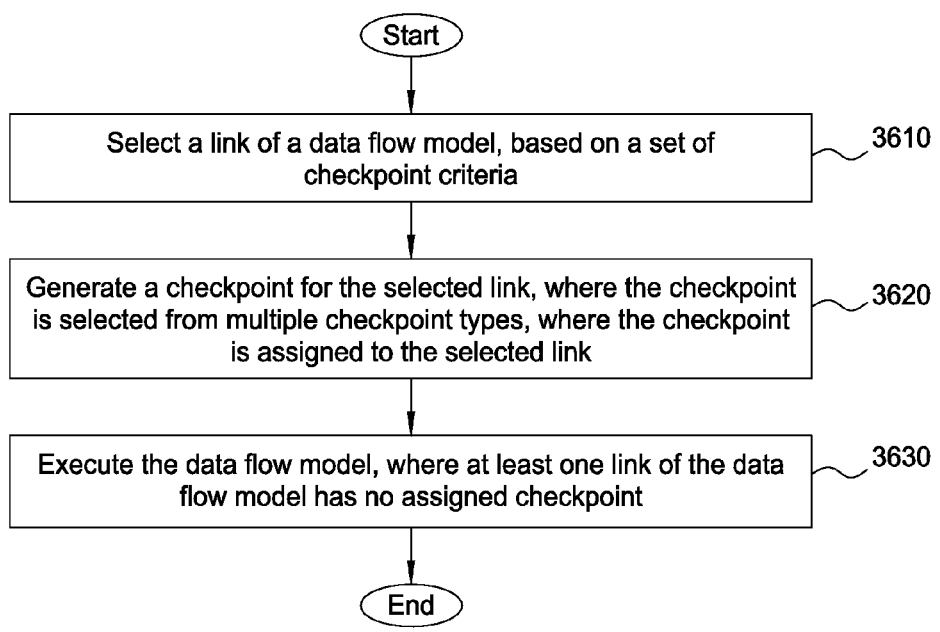
FIG. 36 is a flowchart depicting a method for qualified checkpointing of a data flow, according to one embodiment presented in this disclosure.

FIG. 36 is a flowchart depicting a method 3600 for qualified checkpointing of a data flow, according to one embodiment presented in this disclosure. As shown, the method 3600 begins at step 3610, where the application 108 selects a link of a data flow model, based on a set of checkpoint criteria. At step 3620, the application 108 generates a checkpoint for the selected link. In some embodiments, the checkpoint may be generated based on the set of checkpoint criteria. Further, the checkpoint may be selected from multiple checkpoint types. Further still, the checkpoint may be assigned to the selected link. At step 3630, the application 108 invokes execution of the data flow model, in which at least one link has no assigned checkpoint. After the step 3630, the method 3600 terminates.

Accordingly, at least some embodiments disclosed herein provide techniques for qualified checkpointing for data flows processed in network environments, such as cloud computing environments. At least in some cases, selectively placing checkpoints based on predefined checkpointing criteria and as disclosed herein may reduce the overhead of checkpointing, lower the storage costs, and improve application performance, while maintaining the same or a similar level of service that is provided by alternative approaches such as full checkpointing.

Figure 37:
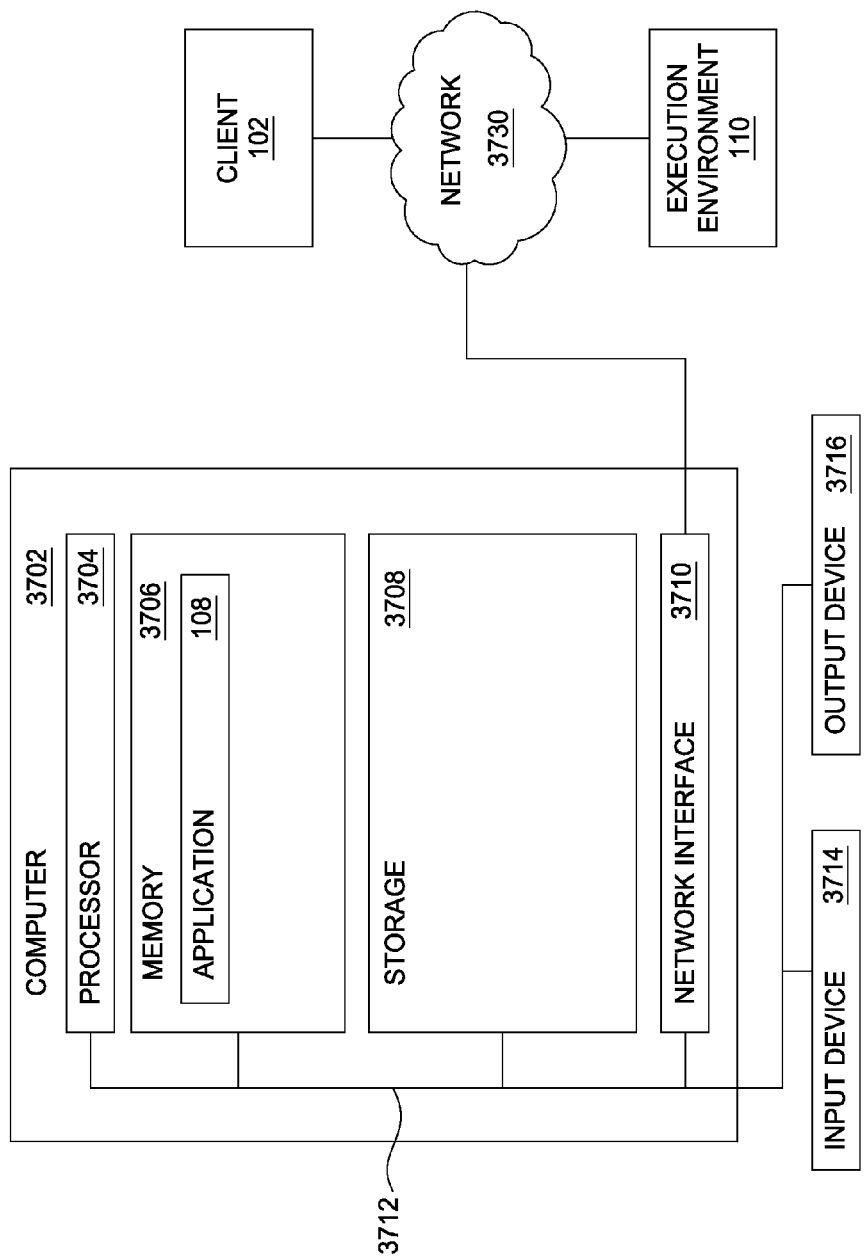
FIG. 37 is a block diagram illustrating components of a networked system configured for data integration on retargetable engines, according to one embodiment presented in this disclosure.

FIG. 37 is a block diagram illustrating components of a networked system 3700 configured for data integration on retargetable engines, according to one embodiment presented in this disclosure. The networked system 3700 includes a computer 3702. The computer 3702 may also be connected to other computers via a network 3730. In general, the network 3730 may be a telecommunications network and/or a wide area network (WAN). In a particular embodiment, the network 3730 is the Internet.

The computer 3702 generally includes a processor 3704 connected via a bus 3712 to a memory 3706, a network interface device 3710, a storage 3708, an input device 3714, and an output device 3716. The computer 3702 is generally under the control of an operating system. Examples of operating systems include IBM z/OS®, UNIX, versions of the Microsoft Windows® operating system, and distributions of the Linux® operating system. More generally, any operating system supporting the functions disclosed herein may be used. The processor 3704 is included to be representative of a single CPU, multiple CPUs, a single CPU having multiple processing cores, and the like. Similarly, the memory 3706 may be a random access memory. While the memory 3706 is shown as a single identity, it should be understood that the memory 3706 may comprise a plurality of modules, and that the memory 3706 may exist at multiple levels, from high speed registers and caches to lower speed but larger DRAM chips. The network interface device 3710 may be any type of network communications device allowing the computer 3702 to communicate with other computers via the network 3730.

The storage 3708 may be a persistent storage device. Although the storage 3708 is shown as a single unit, the storage 3708 may be a combination of fixed and/or removable storage devices, such as fixed disc drives, solid state drives, floppy disc drives, tape drives, removable memory cards or optical storage. The memory 3706 and the storage 3708 may be part of one virtual address space spanning multiple primary and secondary storage devices.

The input device 3714 may be any device for providing input to the computer 3702. For example, a keyboard, a mouse, a touchpad, voice commands, or any combination thereof may be used. The output device 3716 may be any device for providing output to a user of the computer 3702. For example, the output device 3716 may be any display screen or set of speakers. Although shown separately from the input device 3714, the output device 3716 and input device 3714 may be combined. For example, a display screen with an integrated touch-screen may be used.

As shown, the memory 3706 of the computer 3702 includes the application 108 of FIG. 1. Depending on the embodiment, one or more of the components of the application 108 as depicted in FIG. 1 may execute on the computer 3702 or on one or more other computers operatively connected to the computer 3702 via the network 3730. Further, the client 102 and the execution environment 110 of FIG. 1 may each also execute on one or more other computers operatively connected to the computer 3702 via the network 3730.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure comprising a network of interconnected nodes.

Figure 38:
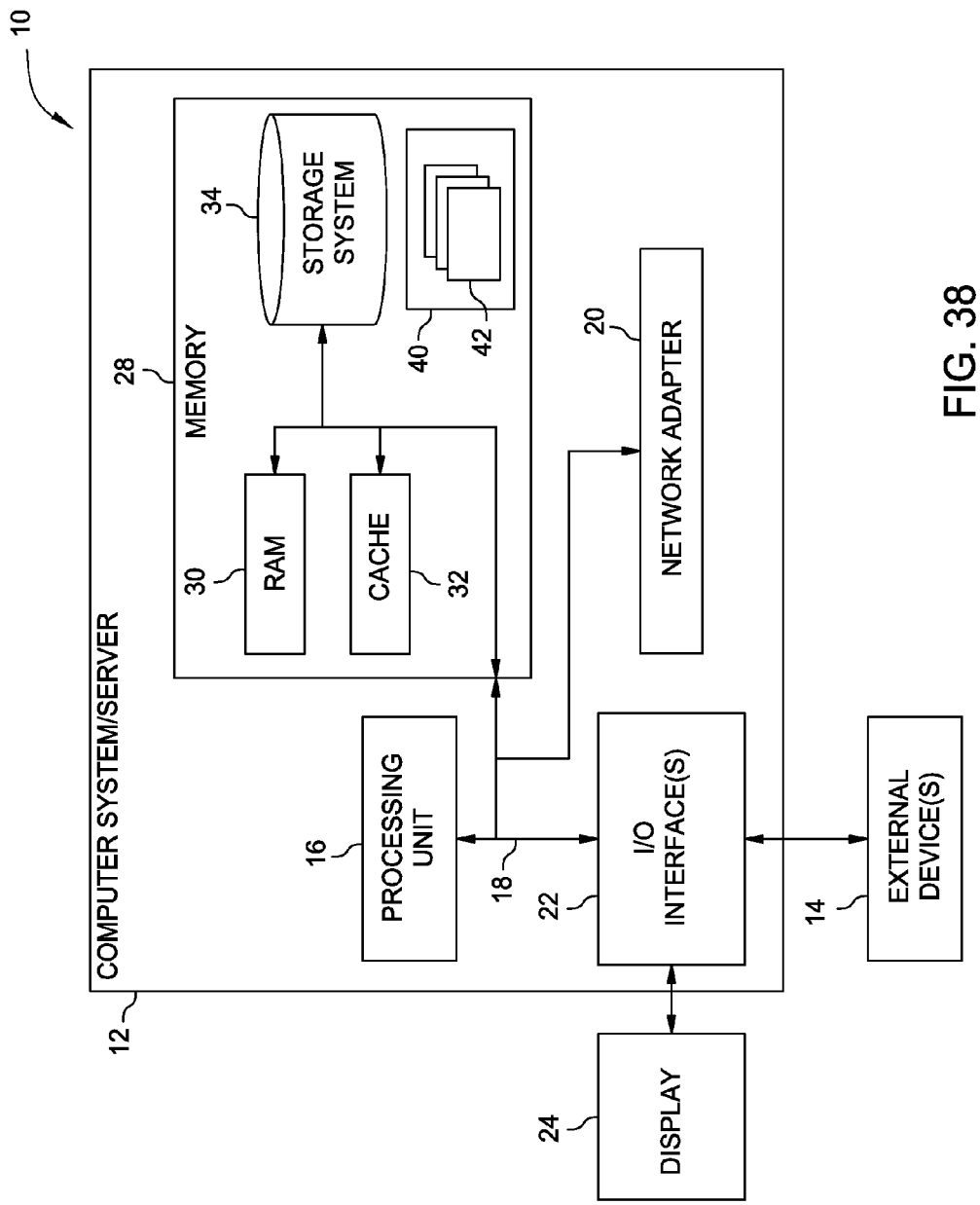
FIG. 38 is a block diagram illustrating a cloud computing node for data integration on retargetable engines, according to one embodiment presented in this disclosure.

Referring now to FIG. 38, a schematic of an example of a cloud computing node for data integration on retargetable engines is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 38, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 39:
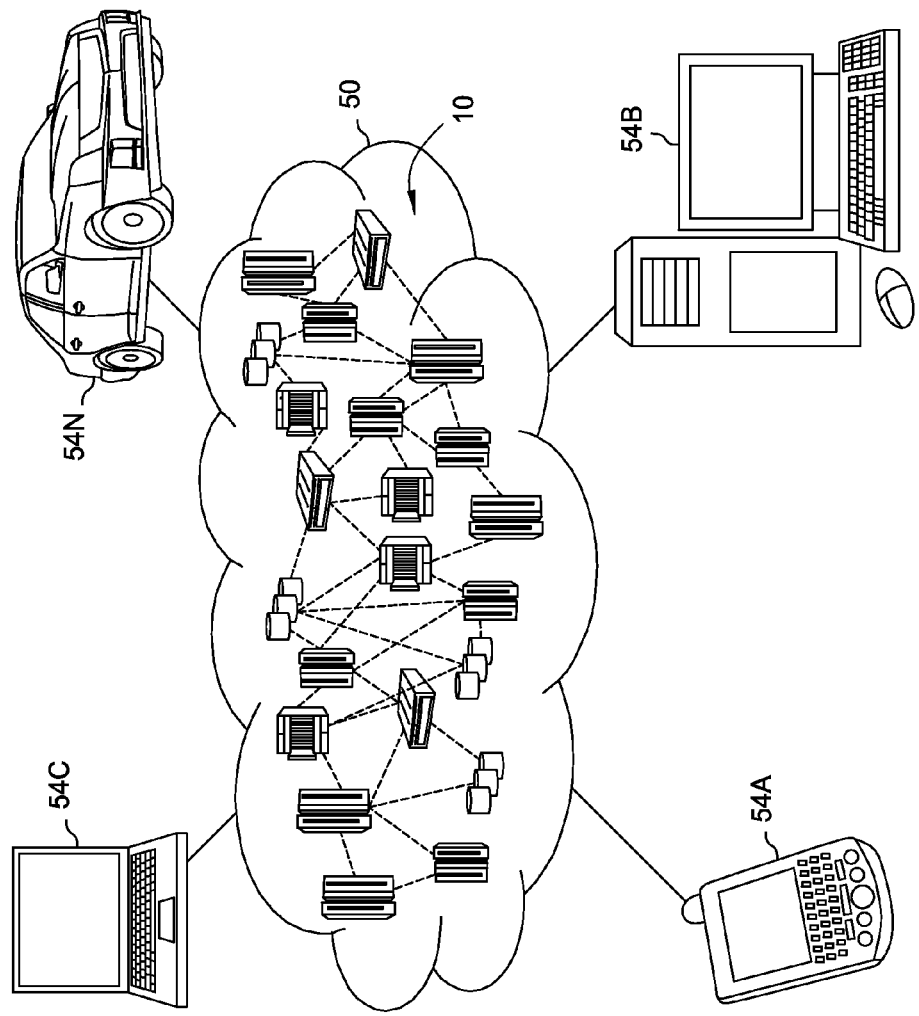
FIG. 39 illustrates a cloud computing environment for data integration on retargetable engines, according to one embodiment presented in this disclosure.

Referring now to FIG. 39, illustrative cloud computing environment 50 for data integration on retargetable engines is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 21 are intended to be illustrative only and that computing nodes 10 and cloud computing environment 50 can communicate with any type of computerized device over any type of network and/or network addressable connection (e.g., using a web browser).

Figure 40:
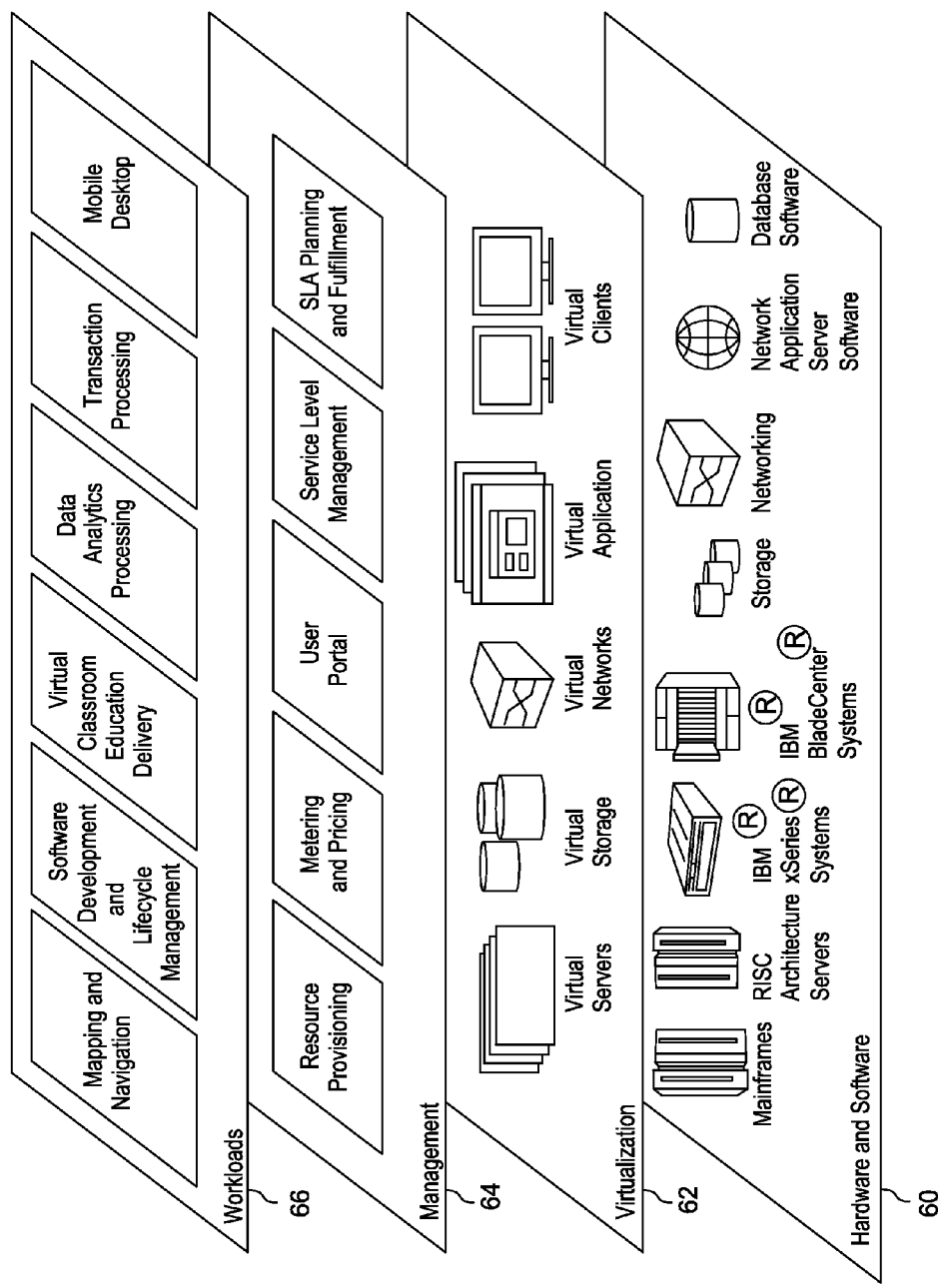
FIG. 40 illustrates abstraction model layers of the cloud computing environment for data integration on retargetable engines, according to one embodiment presented in this disclosure.

Referring now to FIG. 40, a set of functional abstraction layers provided by cloud computing environment 50 (FIG. 39) for data integration on retargetable engines is shown. It should be understood in advance that the components, layers and functions shown in FIG. 21 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The SLA generally specifies the services, priorities, responsibilities, guarantees and/or warranties that exist between a service provider and a customer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user may request a data flow to be executed on an appropriate data processing engine available in the cloud. The application 108 may determine the appropriate data processing engine based on predefined criteria and according to an empirical model disclosed herein. Additionally or alternatively, the application 108 may generate one or more qualified checkpoints for a desired data flow based on the techniques disclosed herein. Thus, the user may request execution of data flows and access results thereof, from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer program product for qualified checkpointing of a data flow model having a plurality of data flow operators and a plurality of links connecting the data flow operators, the computer program product comprising:
   a non-transitory computer-readable medium having program code embodied therewith, the program code executable by one or more computer processors to:
   select a link of the plurality of links of the data flow model, that satisfies one or more checkpoint criteria from a predefined set of checkpoint criteria;
   generate a checkpoint for the selected link, wherein the checkpoint is selected from a retargetable checkpoint, a connection checkpoint, a parallel checkpoint, a bottleneck checkpoint, and a recovery checkpoint, wherein at least four of the retargetable checkpoint, the connection checkpoint, the parallel checkpoint, the bottleneck checkpoint, and the recovery checkpoint are generable by the program code, wherein the generated checkpoint is assigned to the selected link; and
   execute the data flow model, wherein at least one link of the plurality of links of the data flow model has no assigned checkpoint.

2. The computer program product of claim 1, wherein the predefined set of checkpoint criteria specifies to:
   generate the retargetable checkpoint between two sub-flows of different processing types; and
   generate the connection checkpoint between two sub-flows having different design focus properties.

3. The computer program product of claim 2, wherein the predefined set of checkpoint criteria further specifies to:
   generate the parallel checkpoint between two sub-flows having a measure of pipeline parallelism beyond a predefined threshold;
   generate the bottleneck checkpoint between an upstream sub-flow and a data flow operator identified as having a potential bottleneck; and
   generate the recovery checkpoint between an upstream sub-flow and a data flow operator having a highest measure of likelihood of failing among the plurality of data flow operators of the data flow model.

4. The computer program product of claim 3, wherein the data flow model is executable across different runtime engine types, wherein a first sub-flow of the data flow is executable on a retargetable engine type, and wherein multiple sub-flows of the data flow are executable in parallel.

5. The computer program product of claim 4, whereby the data flow supports both performance enhancement and failure recovery, without requiring full checkpointing of the data flow, wherein full checkpointing of the data flow comprises assigning a respective checkpoint to each link of the data flow.

6. The computer program product of claim 5, wherein the program code is of an application, wherein the application includes a request handler component, an engine selector component, an engine manager component, a score composer component, and an execution manager component.

7. The computer program product of claim 1, wherein generating the checkpoint for the selected link comprises:
   generating the retargetable checkpoint between two sub-flows of different processing types.

8. The computer program product of claim 1, wherein generating the checkpoint for the selected link comprises:
   generating the connection checkpoint between two sub-flows having different design focus properties.

9. The computer program product of claim 1 wherein generating the checkpoint for the selected link comprises:
   generating the parallel checkpoint between two sub-flows having a measure of pipeline parallelism beyond a predefined threshold.

10. The computer program product of claim 1, wherein generating the checkpoint for the selected link comprises:
    generating the bottleneck checkpoint between an upstream sub-flow and a data flow operator identified as having a potential bottleneck.

11. A system for qualified checkpointing of a data flow model having a plurality of data flow operators and a plurality of links connecting the data flow operators, the system comprising:
    one or more computer processors;
    a memory containing a program which, when executed by the one or more computer processors, is configured to perform an operation comprising:
    selecting a link of the plurality of links of the data flow model, that satisfies one or more checkpoint criteria from a predefined set of checkpoint criteria;
    generating a checkpoint for the selected link, wherein the checkpoint is selected from a retargetable checkpoint, a connection checkpoint, a parallel checkpoint, a bottleneck checkpoint, and a recovery checkpoint, wherein at least four of the retargetable checkpoint, the connection checkpoint, the parallel checkpoint, the bottleneck checkpoint, and the recovery checkpoint are generable by the program, wherein the generated checkpoint is assigned to the selected link; and executing the data flow model, wherein at least one link of the plurality of links of the data flow model has no assigned checkpoint.

12. The system of claim 11, wherein the predefined set of checkpoint criteria specifies to:
   generate the retargetable checkpoint between two sub-flows of different processing types; and
   generate the connection checkpoint between two sub-flows having different design focus properties.

13. The system of claim 12, wherein the predefined set of checkpoint criteria further specifies to:
   generate the parallel checkpoint between two sub-flows having a measure of pipeline parallelism beyond a predefined threshold;
   generate the bottleneck checkpoint between an upstream sub-flow and a data flow operator identified as having a potential bottleneck; and
   generate the recovery checkpoint between an upstream sub-flow and a data flow operator having a highest measure of likelihood of failing among the plurality of data flow operators of the data flow model.

14. The system of claim 13, wherein the data flow model is executable across different runtime engine types, wherein a first sub-flow of the data flow is executable on a retargetable engine type, and wherein multiple sub-flows of the data flow are executable in parallel.

15. The system of claim 14, whereby the data flow supports both performance enhancement and failure recovery, without requiring full checkpointing of the data flow, wherein full checkpointing of the data flow comprises assigning a respective checkpoint to each link of the data flow; wherein the program includes a request handler component, an engine selector component, an engine manager component, a score composer component, and an execution manager component.

16. The system of claim 11, wherein generating the checkpoint for the selected link comprises:
   generating the retargetable checkpoint between two sub-flows of different processing types.

17. The system of claim 11, wherein generating the checkpoint for the selected link comprises:
   generating the connection checkpoint between two sub-flows having different design focus properties.

18. The system of claim 11, wherein generating the checkpoint for the selected link comprises:
   generating the parallel checkpoint between two sub-flows having a measure of pipeline parallelism beyond a predefined threshold.

19. The system of claim 11, wherein generating the checkpoint for the selected link comprises:
   generating the bottleneck checkpoint between an upstream sub-flow and a data flow operator identified as having a potential bottleneck.

20. The system of claim 11, wherein generating the checkpoint for the selected link comprises:
   generating the recovery checkpoint between an upstream sub-flow and a data flow operator having a highest measure of likelihood of failing among the plurality of data flow operators of the data flow model.

* * * * *